US 12,448,971 B2

United States Patent
Lee et al.

(10) Patent No.: US 12,448,971 B2
(45) Date of Patent: Oct. 21, 2025

(54) COMPACT LOW NOISE ROTARY COMPRESSOR

(71) Applicant: ASPEN COMPRESSOR, LLC, Marlborough, MA (US)

(72) Inventors: Kang P. Lee, Sudbury, MA (US); Douglas S. Olsen, Natick, MA (US)

(73) Assignee: ASPEN COMPRESSOR, LLC, Marlborough, MA (US)

( * ) Notice: Subject to any disclaimer, the term of this patent is extended or adjusted under 35 U.S.C. 154(b) by 0 days.

(21) Appl. No.: 16/889,055

(22) Filed: Jun. 1, 2020

(65) Prior Publication Data
US 2020/0300247 A1    Sep. 24, 2020

Related U.S. Application Data

(63) Continuation of application No. 15/100,876, filed as application No. PCT/US2014/067933 on Dec. 1, 2014, now Pat. No. 10,670,017.
(Continued)

(51) Int. Cl.
*F04C 29/06* (2006.01)
*F04C 18/356* (2006.01)
*F04C 29/00* (2006.01)

(52) U.S. Cl.
CPC .......... *F04C 29/068* (2013.01); *F04C 18/356* (2013.01); *F04C 29/0085* (2013.01);
(Continued)

(58) Field of Classification Search
CPC ..... F04C 2240/40–2240/403; F04C 2240/805; F04C 2240/10; F04C 2240/00;
(Continued)

(56) References Cited

U.S. PATENT DOCUMENTS 1,038,396 A * 9/1912 Langford ............ F16L 27/0832
285/332
2,031,940 A    2/1936 Drysdale
(Continued)

FOREIGN PATENT DOCUMENTS

CN    1498311 A    5/2004
CN    1629478 A    6/2005
(Continued)

OTHER PUBLICATIONS

Machine Translation of EP 0810716 B1 to Neumair, retrieved from espacenet on Sep. 19, 2023 (Year: 2023).*
(Continued)

*Primary Examiner* — Essama Omgba
*Assistant Examiner* — Dnyanesh G Kasture
(74) *Attorney, Agent, or Firm* — Wolf, Greenfield & Sacks, P.C.

(57) ABSTRACT

The present disclosure relates to a low noise, compact rotary compressor configured to damp noise and vibration generated from internal components. The compressor may include a stator holder coupled to the stator and the pump, providing physical separation between the stator and the casing. The compressor may also include a pump holder coupled to the pump and the casing, providing physical separation between the pump and the casing. Additional damping components may be placed at various coupling points within and around the stator holder and/or pump holder. The suction line connection may also be configured to reduce noise and vibration. Aspects of the present disclosure may be applicable for reducing the noise and vibration in a number of fluid displacement devices and BLDC motors.

18 Claims, 18 Drawing Sheets

Related U.S. Application Data

(60) Provisional application No. 61/910,357, filed on Dec. 1, 2013.

(52) U.S. Cl.
CPC ...... *F04C 2210/26* (2013.01); *F04C 2230/60* (2013.01); *F04C 2240/40* (2013.01); *F04C 2270/12* (2013.01)

(58) Field of Classification Search
CPC ............ F04C 2270/12; F04C 2270/125; F04C 2270/13; F04C 2270/135; F04C 29/068; F04C 29/0085; F04C 18/356; F04C 2210/26; F04C 2230/60; F04C 11/008; F04C 2240/30; F04B 53/003; F04B 39/0044; F04B 2203/0206; F04D 29/668; H02K 7/14; H02K 1/12; H02K 5/128; H02K 5/1675; H02K 7/085; H02K 7/088; H02K 9/19; H02K 5/124; H02K 5/1282; H02K 5/132
USPC .................. 417/371, 360, 363; 310/216.113–216.137; 285/11
See application file for complete search history.

(56) References Cited

U.S. PATENT DOCUMENTS

| | | | | |
|---|---|---|---|---|
| 2,935,244 A * | 5/1960 | Dills | ........................ | F25B 31/02 417/415 |
| 3,270,952 A * | 9/1966 | Bellmer | ................... | F25B 31/02 137/467.5 |
| 3,334,808 A * | 8/1967 | Parker | .................... | F25B 31/002 417/372 |
| 3,526,942 A * | 9/1970 | Tuneo | ..................... | F25B 31/026 417/372 |
| 3,849,028 A * | 11/1974 | Kurita | .................... | F04B 39/127 417/363 |
| 3,894,815 A * | 7/1975 | Beeton | ................ | F04D 25/0606 417/372 |
| 4,086,032 A * | 4/1978 | Nishioka | ............... | F04B 39/123 417/363 |
| 4,431,387 A * | 2/1984 | Lassota | ..................... | F02F 11/00 417/372 |
| 4,566,865 A | 1/1986 | Nishitsuji et al. | | |
| 4,834,627 A * | 5/1989 | Gannaway | ............... | F04B 39/04 417/415 |
| 5,342,179 A * | 8/1994 | Dreiman | ................... | F16F 3/02 417/363 |
| 5,404,614 A * | 4/1995 | Stephens | ................. | A47L 5/365 15/327.2 |
| 5,498,143 A | 3/1996 | Dreiman et al. | | |
| 5,965,966 A | 10/1999 | Aiello et al. | | |
| 6,190,144 B1 | 2/2001 | Balma | | |
| 6,290,472 B2 * | 9/2001 | Gannaway | ............ | F01C 21/108 418/60 |
| 6,361,293 B1 * | 3/2002 | Harper | .................. | F04C 23/008 417/312 |
| 6,930,416 B1 | 8/2005 | Remington et al. | | |
| 7,077,633 B2 * | 7/2006 | Yoda | ........................ | F01C 21/10 184/6.16 |
| 7,618,242 B2 * | 11/2009 | Higuchi | ................. | F04C 18/332 417/410.3 |
| 10,670,017 B2 | 6/2020 | Lee et al. | | |
| 2002/0067998 A1 | 6/2002 | Narney, II et al. | | |
| 2003/0021706 A1 * | 1/2003 | Kim | .................... | F04C 18/0215 417/363 |
| 2003/0223895 A1 | 12/2003 | Lee | | |
| 2004/0071568 A1 | 4/2004 | Hyeon | | |
| 2005/0152792 A1 | 7/2005 | Ogasawara et al. | | |
| 2006/0103252 A1 | 5/2006 | Yokota | | |
| 2006/0216165 A1 | 9/2006 | Lee | | |
| 2008/0292484 A1 | 11/2008 | Suh et al. | | |
| 2009/0180907 A1 | 7/2009 | Udea et al. | | |
| 2010/0084933 A1 * | 4/2010 | Ishikawa | ................. | F01C 21/10 310/91 |
| 2010/0166577 A1 | 7/2010 | Higuchi et al. | | |
| 2011/0243779 A1 * | 10/2011 | Masuda | ................ | F04C 18/322 418/67 |
| 2011/0293445 A1 | 12/2011 | An et al. | | |
| 2011/0303211 A1 * | 12/2011 | Gove | .................... | F24H 9/0068 126/112 |
| 2012/0171067 A1 | 7/2012 | Lee et al. | | |
| 2012/0183422 A1 * | 7/2012 | Bahmata | ................ | H02K 1/185 417/423.15 |
| 2012/0243982 A1 * | 9/2012 | Sasaki | .................... | F04D 29/624 415/213.1 |
| 2013/0078123 A1 | 3/2013 | Fukasaku et al. | | |
| 2013/0129539 A1 * | 5/2013 | Lee | ..................... | F04C 18/0207 417/410.5 |
| 2013/0264140 A1 * | 10/2013 | Nakayama | ............. | H02K 3/522 180/443 |
| 2013/0266396 A1 * | 10/2013 | Dionne | ................... | F16B 35/06 411/313 |
| 2014/0180483 A1 | 6/2014 | Cheng et al. | | |
| 2016/0001624 A1 | 1/2016 | Meissner et al. | | |
| 2016/0025094 A1 | 1/2016 | Ignatiev et al. | | |
| 2016/0186763 A1 * | 6/2016 | Keber | .................... | F23D 14/34 417/423.12 |
| 2016/0305431 A1 | 10/2016 | Lee et al. | | |
| 2019/0338772 A1 | 11/2019 | Lee et al. | | |

FOREIGN PATENT DOCUMENTS

| | | | | |
|---|---|---|---|---|
| CN | 200985884 Y | 12/2007 | | |
| CN | 201771770 U | 3/2011 | | |
| CN | 102257278 A | 11/2011 | | |
| CN | 102261334 A | 11/2011 | | |
| CN | 103237990 A | 8/2013 | | |
| EP | 0810716 B1 * | 10/2001 | ............. | F04D 13/06 |
| EP | 2330301 A1 | 6/2011 | | |
| KR | 10-1999-0030635 | 5/1999 | | |
| KR | 10-2003-0092714 A | 12/2003 | | |
| KR | 10-2004-0090848 A | 10/2004 | | |
| KR | 10-2013-0055407 A | 5/2013 | | |

OTHER PUBLICATIONS

U.S. Appl. No. 15/100,876, filed Jun. 1, 2016, Lee et al.
U.S. Appl. No. 16/474,709, filed Jun. 28, 2019, Lee et al.
PCT/US2014/067933, Apr. 23, 2015, International Search Report and Written Opinion.
PCT/US2014/067933, Jun. 16, 2016, International Preliminary Report on Patentability.
PCT/US2017/069087, Feb. 26, 2018, International Search Report and Written Opinion.
PCT/US2017/069087, Jul. 11, 2019, International Preliminary Report on Patentability.
International Search Report and Written Opinion for Application No. PCT/US2014/067933, mailed Apr. 23, 2015.
International Preliminary Report on Patentability for Application No. PCT/US2014/067933, mailed Jun. 16, 2016.
International Search Report and Written Opinion for International Application No. PCT/US2017/069087 dated Feb. 26, 2018.
International Preliminary Report on Patentability for International Application No. PCT/US2017/069087 mailed Jul. 11, 2019.

\* cited by examiner

| Comp. Designation / Parameteres | A | B | C | D | E |
|---|---|---|---|---|---|
| | Compact BLDC rotary compressor, without noise/vibration reduction measures | Semi-Compact Rotary BLDC compressor with large mass & other means to reduce noise/vibration | BLDC reciprocating compressor with large housing for conventional noise/vibration reduction measures | Compact BLDC rotary compressor, with noise/vibration reduction measures | Compact BLDC rotary compressor, with noise/vibration reduction measures |
| Input Voltage, VDC | 12 | | | | |
| Displacement, cc/rev. | 1.4 | 1.0 | 2.0 | 1.9 | 1.4 |
| Cooling Capacity, W | 360 | 145 | 234 | 455 | 360 |
| Comp. Weight, lbs | 1.45 | 3.20 | 9.50 | 1.93 | 1.87 |
| Comp. Volume, in³ | 11 | 24 | 130 | 13 | 13 |
| Height with tube, in. | 3.5 | 5.4 | 8 | 4.0 | 4.0 |
| Max. Diameter, in. | 2.2 | 2.4 | 8 | 2.6 | 2.6 |
| Gravimetric Cooling capacity Density, W/lb | 249 | 45 | 23 | 236 | 193 |
| Relative Ratio | 11 | 2.0 | 1.0 | 10 | 8.4 |
| Volumetric Cooling Capacity Density, W/in³ | 33 | 6.1 | 1.8 | 35 | 28 |
| Relative Ratio | 18 | 3.4 | 1.0 | 19 | 15 |
| Noise Level, dBA, 90cm | 55 @60 Hz | 42 @60 Hz | 35 @60 Hz | 41 @60 Hz | 41 @60 Hz |

Fig. 19

COMPACT LOW NOISE ROTARY COMPRESSOR

CROSS-REFERENCE TO RELATED APPLICATIONS

This Application is a Continuation of U.S. application Ser. No. 15/100,876, filed Jun. 1, 2016, which is a national stage filing under 35 U.S.C. § of International Patent Application Serial No. PCT/US2014/067933, filed Dec. 1, 2014, which claims priority to U.S. Application Ser. No. 61/910,357, filed Dec. 1, 2013. The entire contents of these applications are incorporated herein by reference in their entirety.

BACKGROUND

1. Field

Aspects described herein relate generally to low noise, compact compressor systems and assemblies.

2. Discussion of Related Art

Rotary compressors may be used for a number of cooling applications. For example, rotary compressors may be incorporated within refrigerators, countertop beverage dispensers, freezers, coolers and air conditioners for automobiles, buses, trucks and ships. Compressors come in a number of configurations, for example, reciprocating compressors, and rotary compressors such as rolling piston compressor, rotary vane compressors, scroll compressors, rotary screw compressors, centrifugal compressors, and swing compressors.

Reciprocating compressors use reciprocating piston within a cylinder to compress fluids having entered the system through a suction line, and delivers the high pressure fluid via a discharge port. Rotary vane compressors typically include a rotor with a number of blades associated with radial slots of the rotor. The rotor is mounted so as to be offset with the overall housing such that when the rotor turns, the vanes create a series of continuously changing volumes. Rotary scroll compressors include interleaving scrolls where one of the scrolls orbits the other eccentrically without rotating, causing fluid to be trapped and compressed between the scrolls. Rotary screw compressors employ helical screw rotors enmeshed together to force fluid through the compressor. Centrifugal compressors create a pressure differential by using a rotor or impeller to add kinetic energy to a continuous flow of fluid. This kinetic energy is converted to potential energy by slowing the flow through a diffuser. A swing compressor is a variation of a rolling piston compressor with a swinging integrated vane-roller assembly instead of shuttling vane in a vane slot against a rolling roller-piston.

SUMMARY

The inventor has recognized that it would be advantageous to manufacture a compact, low volume and weight rotary compressor that generates relatively low levels of noise and vibration. For a desired range of cooling capacity, under an operating condition characterized by a condensing temperature of 120 degrees F., evaporating temperature of 45 degrees F., superheat of 10 degrees F. and subcooling of 10 degrees F., rotary compressors of the present disclosure may exhibit a relatively high gravimetric cooling capacity (e.g., greater than 100 W/lb) and/or volumetric cooling capacity (e.g., greater than 20 W/in$^3$), with low noise output (e.g., less than 45 dBA measured at a frequency of 60 Hz and a distance of 90 cm). In various embodiments, the rotary compressor may be constructed so as to damp noise and vibration generated from internal components, such as the pump and the motor.

The compressor may include a stator holder coupled to the stator and the pump, providing physical separation between the stator and the casing. The compressor may also include a pump holder coupled to the pump and the casing, providing physical separation between the pump and the casing. Such separation, in addition to the optional placement of damping components at various coupling points, may serve to reduce acoustic and vibrational energy throughout the system. In some cases, the stator holder and/or the pump holder may beneficially reduce manufacturing fall-outs, and may be small enough such that there is no requirement for a larger casing or space within which the motor pump assembly is inserted to be provided, relative to existing compact rotary compressor systems.

The suction line connection of the compressor may also be configured to reduce noise and vibration. For example, the suction line connection may include additional damping components placed adjacent the suction line. Or, one or more additional degrees of freedom (e.g., rotational) may be incorporated at the suction line. Alternatively, for some embodiments, the internals of the compressor may be separated into different pressure zones. Each of these embodiments, as well as others, may contribute to reducing overall acoustic noise and vibrations from the compressor system.

In an illustrative embodiment, a rotary compressor of rolling piston type is provided. The compressor includes a motor having a stator and a rotor electromagnetically coupled to one another; a pump physically coupled to the rotor of the motor, the pump configured to draw in fluid through a suction line to an internal space within the pump and to compress and discharge the fluid through a discharge line; a casing surrounding the motor and the pump; a stator holder coupled to the stator of the motor and the pump, the stator holder providing physical separation between the stator and the casing, and the stator holder constructed and arranged to reduce acoustic and vibrational energy transfer between the stator and the pump; and a pump holder coupled to the pump and the casing, the pump holder providing physical separation between the pump and the casing, and the pump holder constructed and arranged to reduce acoustic and vibrational energy transfer between the pump and the casing.

In another illustrative embodiment, a stator holder for a rotary compressor is provided. The stator holder includes a cover adapted to be disposed between a stator of the rotary compressor and a casing of the rotary compressor; and at least one coupling member extending from a lower region of the cover, and constructed and arranged to facilitate coupling between the stator of the rotary compressor and a pump of the rotary compressor.

In yet another illustrative embodiment, a pump holder for a rotary compressor is provided. The pump holder includes a base constructed and arranged to be coupled to a pump of the rotary compressor; and at least one coupling member including at least one upright member extending from the base, and constructed and arranged to couple with the pump of the rotary compressor and a casing of the rotary compressor.

In a further illustrative embodiment, a pump assembly for a rotary compressor is provided. The pump assembly includes a motor having a stator and a rotor electromagnetically coupled to one another; a pump coupled to the rotor of the motor, the pump configured to draw in fluid from an external space surrounding the pump to an internal space within the pump; a suction port providing an opening between the internal space and the external space; and at least one damping component constructed and arranged to reduce vibrational energy between the pump and the suction line connection within the suction port.

In another illustrative embodiment, a rotary compressor is provided. The compressor includes a motor having a stator and a rotor electromagnetically coupled to one another; a pump coupled to the rotor of the motor, the pump configured to draw in fluid from an external space surrounding the pump to an internal space within the pump; and a casing surrounding the motor and the pump, wherein the rotary compressor exhibits a gravimetric cooling capacity density of greater than 100 W/lb and a noise level of less than 45 dBA at a frequency of 60 Hz at a distance of 90 cm.

In another illustrative embodiment, a method of assembling a rotary compressor is provided. The method includes coupling a stator to a stator holder; coupling the stator to a pump via the stator holder, the stator holder constructed and arranged to reduce acoustic and vibrational energy transmission between the stator and the pump; and coupling the pump to a pump holder, the pump holder constructed and arranged to reduce acoustic and vibrational energy transmission between the pump and a casing; the stator, the stator holder, the pump and the pump holder forming a motor pump assembly; inserting the motor pump assembly into a space defined by the casing; coupling the motor pump assembly to the casing; inserting a suction tube into a suction port and sealing; connecting a stator winding to an upper cap; and joining the upper cap and the casing to enclose the motor pump assembly and form the rotary compressor.

Various embodiments provide certain advantages. Not all embodiments of the present disclosure share the same advantages and those that do may not share them under all circumstances.

Further features and advantages of the present disclosure, as well as the structure of various embodiments are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. Various embodiments of the present disclosure will now be described, by way of example, with reference to the accompanying drawings. The embodiments and drawings shown are not intended to narrowly define the invention.

FIG. 19 depicts a table comparing various performance features of conventional rotary or reciprocating compressors, and rotary compressors in accordance with various embodiments.

DETAILED DESCRIPTION

Figure 1:
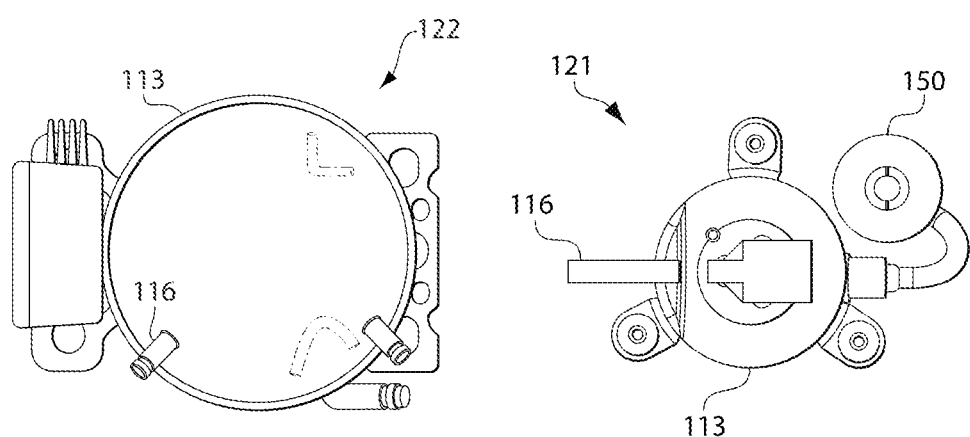
FIG. 1 illustrates an example of a small capacity reciprocating compressor.
Figure 1:
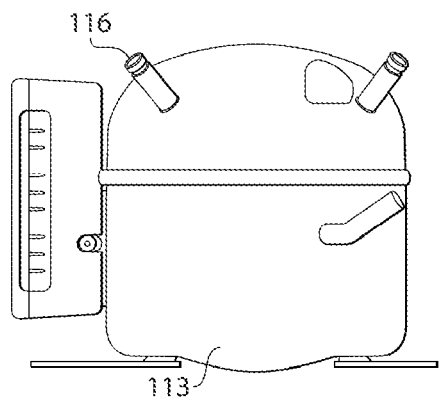

The present disclosure relates to rotary compressors that exhibit cooling capacities within desired specifications, yet are compact and generate relatively low levels of noise and vibration. Various embodiments of rotary compressors may be arranged to incorporate components that are able to reduce the structural transmission of acoustic and vibrational energy generated from active parts, such as the pump and the motor and thermal energy during welding operations in manufacturing.

Rotary compressors, as described herein, may include compressors that are configured to compress fluid (e.g., gas, vapor) by rotary motion of a rotor. In some embodiments, rotary motion may be achieved in cooperation with a roller and a vane inside a cylinder, for example, including one of a rolling piston compressor, a rotating vane compressor, a scroll compressor, a rotary screw compressor, swing piston compressor, etc., including single and twin cylinder (e.g., having a mid plate that separates two cylinders running on a single shaft with two eccentric parts 180 degrees out of phase with each other), as known to those of skill in the art. Various embodiments of rotary compressors may include a suitable motor and pump. The motor may include a rotor and a stator, coupled (e.g., electromagnetically) to each another. The pump may include top and bottom flanges, a cylinder, a vane, a roller, a shaft, a motor rotor, etc., as discussed further below.

In some embodiments, additional components may be integrated with other parts of the compressor so as to reduce or dampen acoustic and vibrational energy that would otherwise be transmitted from the compressor directly to the surroundings and reduce thermal energy from the welding operation into the delicate pump and motor parts. These additional components may provide physical separation between active parts of the compressor (e.g., motor, pump) and the casing. Such components may also serve as conduits through which acoustic and vibrational energy is re-directed, funneled, damped, dissipated, and impeded before being transmitted at reduced levels between the motor and the pump, between the pump and the casing and/or through the suction connection of the compressor.

One of these additional components may be a stator holder. The stator holder may be coupled to the stator of the motor of the compressor on one side and may also be coupled to the pump of the compressor on the other side. Accordingly, the stator holder may physically attach or otherwise couple the stator and the pump together. As discussed further below, the stator holder may provide a gap or space for physically separating the stator and the casing that enclose the internal components, which is in contrast to conventional systems where the stator and casing are rigidly attached to one another, primarily by shrink fit. This physical separation allows for noise/vibration generated from the motor to be directed away from the casing.

Another of these additional components may be a pump holder. The pump holder may be coupled to the pump of the compressor and the casing. Analogous to that of the stator holder with respect to the stator and casing, the pump holder may provide a gap or space for physically separating the pump and the casing, so as to re-direct, funnel, impede, dampen, and dissipate acoustic and vibrational energy such that overall noise/vibration of the system observed from the outside is otherwise reduced.

The connection between the suction line and pump (or the rest of the compressor) may also include one or more additional components and/or may be constructed so as to reduce acoustic and vibrational energy transmission that would otherwise arise in another compressor system. For example, the suction line connection may be configured such that portions thereof are separated from one another, providing additional degrees of freedom or additional tenuous interfaces, and, thus, raising the overall impedance of the system to the transmission of acoustic and vibrational energy.

Various damping components may also be placed at certain regions of the compressor, for example, at coupling points of the stator holder and/or the pump holder or within the holders themselves. Accordingly, embodiments discussed herein may introduce added impedance to the flow of acoustic and vibrational energy within internal components of the compressor, as well as provide impedance discontinuities at interfaces, further retarding the flow of acoustic and vibrational energy within the motor pump assembly (e.g., between the motor stator and the pump assembly, between the pump and the casing), and between the motor pump assembly and the casing.

As provided herein, the impedance to the transmission of acoustic and vibrational energy may refer to the density of the medium multiplied by the speed of wave propagation through the medium. The impedance discontinuity at an interface may refer to an abrupt change in impedance, for example, at a boundary between components.

Aspects of the present disclosure may also beneficially mitigate certain manufacturing issues that may be present during assembly of the compressor. In some instances, aspects of the present disclosure may allow for a lower heat input requirement over a shorter period of time during welding than would otherwise be the case. For example, by appropriately providing certain additional components constructed in a suitable manner, it may not be necessary to weld the steel casing of the compressor to the cast iron cylinder or flanges, but rather welding may occur between the casing and pump holder, where the casing and pump holder may be of similar thickness and/or material (e.g., made of steel). Also, separation of the stator from the casing near the seam welding location between the top cap and the bottom case may significantly lower heat required for seam welding and eliminate thermal damage to the stator and its windings at the same time.

Figure 2:
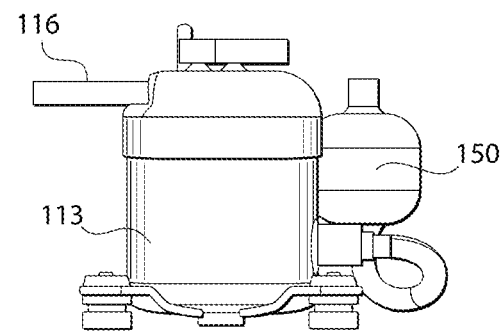
FIG. 2 shows an example of a small capacity rotary compressor at approximately the same scale as FIG. 1 to contrast the size difference for a similar cooling capacity.

FIG. 1 illustrates an example of a small brushless direct current (BLDC) reciprocating compressor 122, and FIG. 2 depicts an example of a small BLDC rotary compressor 121 both shown side by side and drawn to the same scale so as to accentuate the size differences. FIGS. 1-2 show each of the compressors 121, 122 to include a casing 113 and a discharge tube 116. As further shown, the rotary compressor is connected to an accumulator 150 via a suction line. The reciprocating compressor 122 has approximately 17 times the volume of the rotary compressor 121, yet as further shown in FIGS. 3-4, the rotary compressor exhibits an even higher degree of cooling capacity as the reciprocating compressor 122, despite its relatively small size.

Figure 3:
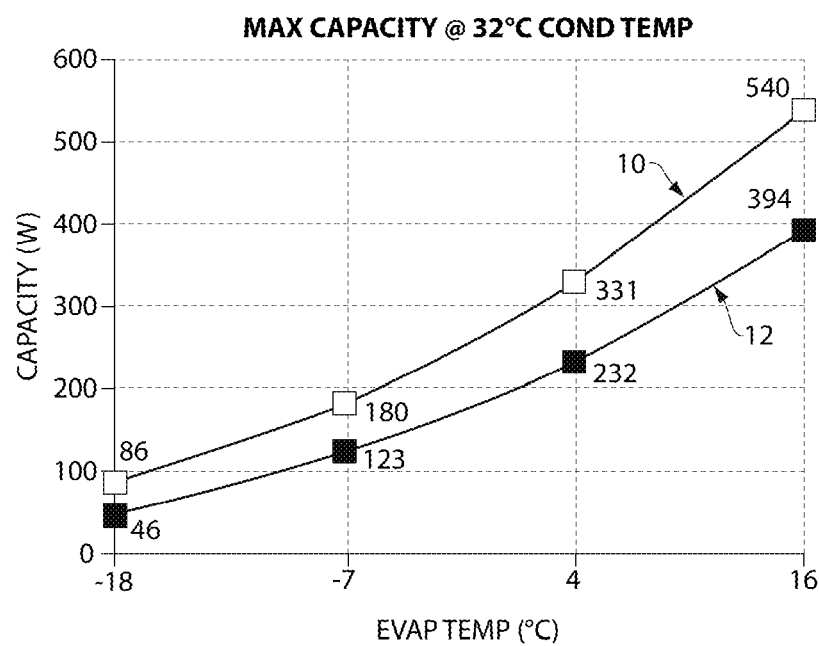
FIG. 3 shows a graph comparing the maximum cooling capacity over a range of evaporator temperatures between the small capacity reciprocating compressor of FIG. 1 and the small capacity rotary compressor of FIG. 2.
Figure 4:
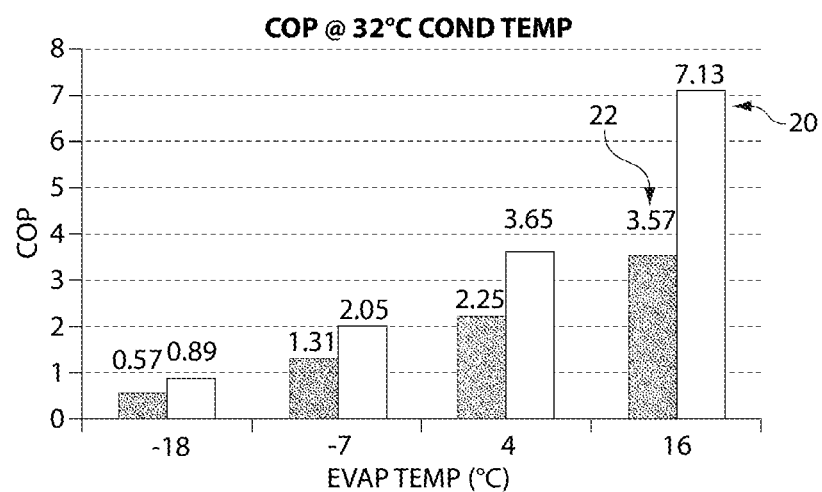
FIG. 4 depicts a graph comparing the coefficient of performance measured at respective maximum cooling capacities over a range of evaporator temperatures between the reciprocating compressor of FIG. 1 and the rotary compressor of FIG. 2.

FIGS. 3-4 show graphs that compare various performance properties of the reciprocating compressor 122 and the rotary compressor 121.

The graph of FIG. 3 depicts the maximum cooling capacity of each of the example compressors over a range of evaporator temperatures, where the curve 10 represents the cooling capacity of the rotary compressor 121 and the curve 12 represents the cooling capacity of the reciprocating compressor 122. As shown, the rotary compressor 121 exhibits a greater maximum cooling capacity in comparison to the reciprocating compressor 122, by approximately 35-90% over the evaporator temperature range shown. As provided herein, maximum cooling capacity (Watts), as illustrated in FIG. 3, is measured at the following operating conditions where each of the temperatures provided are at steady state within a refrigeration system, as known to those of ordinary skill in the art: condensing temperature of 120 degrees F., evaporating temperature of 45 degrees F., superheat of 10 degrees F., subcooling of 10 degrees F., and the respective maximum operating speed of the compressor.

Figure 5:
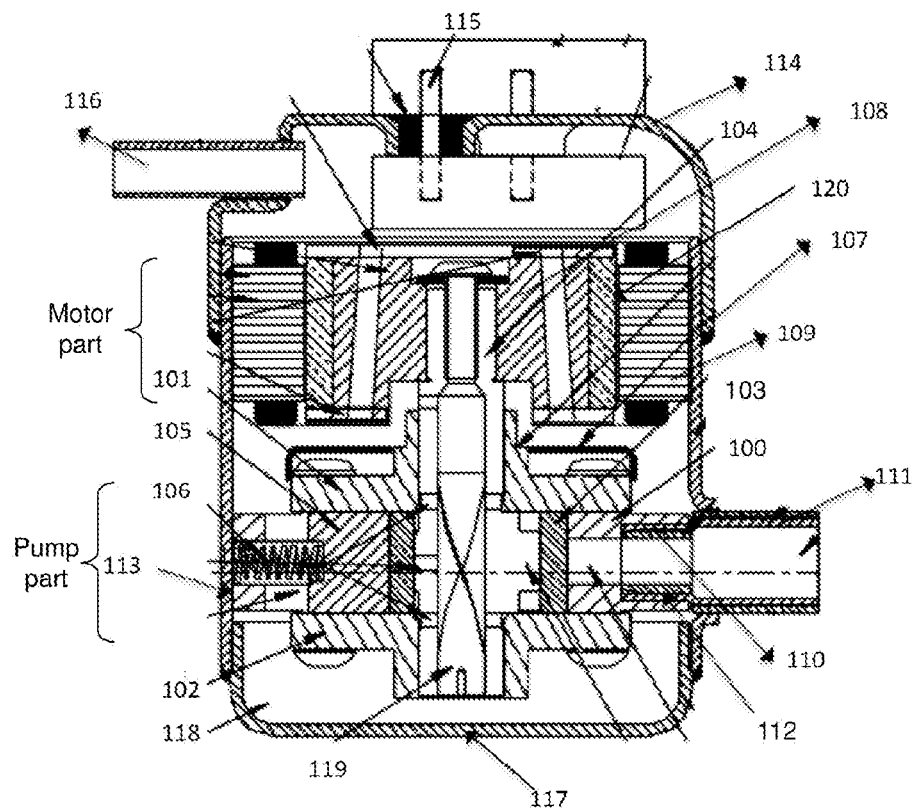
FIG. 5 illustrates a cross-sectional view of a rotary compressor.
Figure 6:
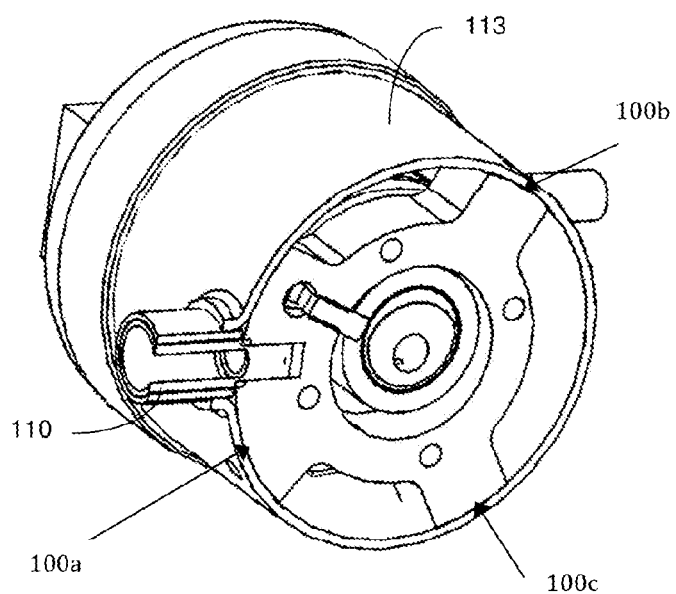
FIG. 6 shows a cut off bottom perspective view of a rotary compressor showing a pump to casing attachment.
Figure 7:
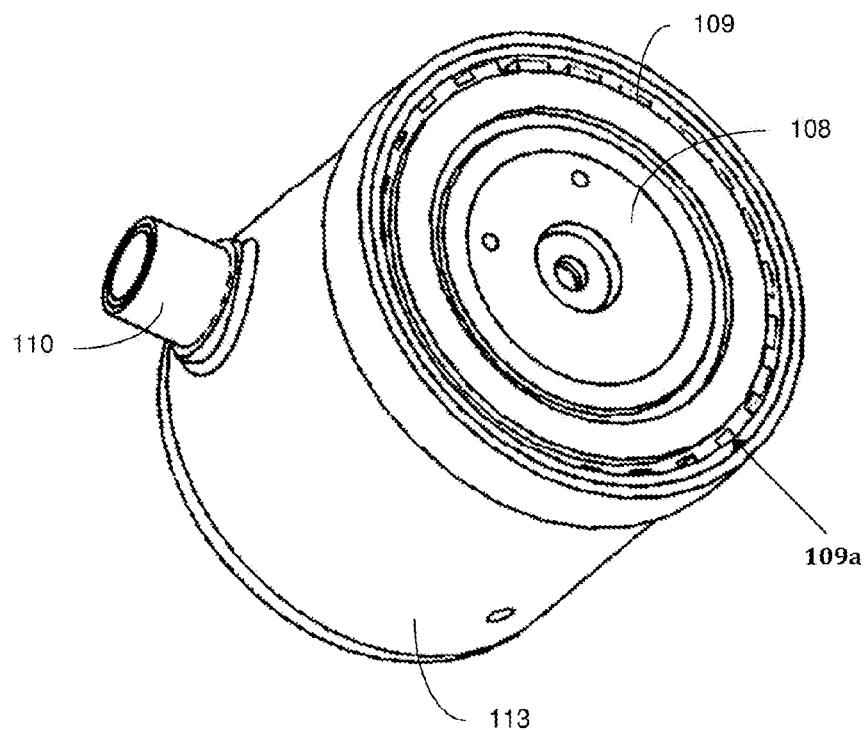
FIG. 7 depicts a cut off top perspective view of a rotary compressor showing a stator to casing attachment.

The graph of FIG. 4 shows the coefficient of performance measured at respective maximum cooling capacities over a range of evaporator temperatures, where the grey bars 20 represent the coefficient of performance of the rotary compressor 121 and the black bars 22 represent the coefficient of performance of the reciprocating compressor 122. As shown, the rotary compressor 121 exhibits a greater coefficient of performance in comparison to the reciprocating compressor 122, by approximately 50-100% over the evaporator temperature range shown, depending on the operating conditions. As provided herein, the coefficient of performance, as illustrated in FIG. 4, is determined by dividing the maximum cooling capacity as described above by the amount of power input into the system. FIGS. 5-7 illustrate various views of a rotary compressor including a pump part, provided as a pump assembly at a lower region of the compressor, and a motor part, provided as a brushless DC motor at an upper region of the compressor. As shown in FIG. 5, the pump part of the compressor includes a cylinder 100, top flange 101, bottom flange 102, roller 103, eccentric shaft 104, vane 105, vane spring 106 and discharge muffler 107; and the motor part of the compressor includes a rotor 108 and stator 109. The cylinder 100 includes a suction port 110, which accommodates suction tube 111 and suction collar 112.

In this embodiment, the suction tube 111 is brazed to the case 113 and extends through the case 113 to connect to the suction port 110, which provides entry into the compressor during the suction process. As shown, the suction tube 111 protrudes out of the casing, and allows low pressure fluid to be introduced into the compressor at the suction port.

As shown, a top cap 114 is attached at an upper part of the casing 113. The top cap 114 has an electrical terminal 115 connected to the winding of the stator 109 and brazed to discharge tube 116. A bottom cap 117 is attached at a lower part of the case 113 where the oil sump 118 is located. In this embodiment, the top cap 114 and the bottom cap 117 are welded to the casing 113, though, the bottom cap and the casing 113 can be a single part made from a deep drawing sheet metal fabrication process.

The bottom of the shaft 104 has a screw shaped oil pump 119 that is configured to help pump oil to the inside of pump for lubrication of moving parts during operation, with the assistance of high discharge pressure refrigerant inside the casing. The rotor 108 is mounted at the top of the eccentric shaft 104 and concentrically centered within the stator 109, and with a narrow and ideally uniform radial air gap 120 (e.g., annular-shaped) between the motor and the stator.

During operation of the compressor, the motor drives the eccentric shaft 104 which causes the roller 103 to roll along the inner surface of the cylinder 100. This motion causes changes in the trapped volume between the roller 103 and the cylinder 100 which is, in turn, used to draw in fluid (e.g., gas) into the compression space during the suction process. The eccentric shaft 104 and roller 103 further operate to compress the trapped fluid within the compression space, and finally discharge of the fluid when the roller is near the discharge port. Most noise and vibration of the compressor are generated from within the stator, the pump and during gas discharge.

As shown, the discharge tube 116 protrudes out of the housing, and conveys compressed fluid out of the compressor casing. Inside the exterior shell formed by the top cap 114, case 113, and the bottom cap 117, the pressure is kept at the discharge pressure during operation of the compressor, as compressed gas comes out of the muffler and moves into the interior of the casing before exiting out through the discharge tube 116.

Welding processes are often used in the assembly of a rotary compressor. For example, for a rolling piston compressor, three welding processes may be employed. The case 113 may be tack-welded to the pump assembly, the top cap 114 may be seam welded to the case 113, and the case 113 may form a sealed casing with the bottom cap 117.

Tack-welding of the case to the pump may occur at any suitable location, for example, at the cylinder 100, the top flange 101, the bottom flange 102 and/or another appropriate region. For instance, FIGS. 5 and 6 show the cylinder 100 to be tack welded at locations 100a, 100b, 100c to the case 113.

The cylinder interacts directly with various moving parts of the compressor, such as the roller, shaft, vane and top and bottom flanges. Accordingly, a slight distortion or deformation (e.g., few microns) of the cylinder or flange(s) due to heat during tack-welding in critical locations, such as the vane slot or other circular regions may give rise to a number of issues. Such issues may include, for example, seizing of or interference with the vanes (e.g., due to distortion), increased friction, higher leakage, lower cooling performance, an undesirable level of variation in cooling performance, etc., leading to unacceptably high rejection rates during the manufacturing and assembly process. For small rotary compressors, welding can present concerns in part, because there is only a small amount of material to act as a thermal buffer between various components to distribute heat transmitted during welding to avoid thermal distortion or deformation affecting critical dimensions of the pump components.

In rotary compressors such as those shown in FIGS. 5 and 7, the stator 109, with its associated windings and insulators, are in direct contact with the case 113. Customarily, the case 113 is preheated before the stator is inserted into the space enclosed by the case, to shrink fit the stator 109 to the case 113, as it cools down to form a solid, tight contact. FIG. 7 shows the intimate circumferential contact 109a between the stator 109 and the case 113.

However, such a design may pose difficulties in centering and alignment of rotating components. For instance, with this design, the case may not be produced with the same degree of precision as the pump parts. The process of shrink-fitting of the case 113 to the stator 109 may not result in a precise case to stator alignment and positioning. Tack welding of the cylinder 100 of the pump assembly to the case might also not result in precise case to pump alignment and positioning. That is, positioning and alignment errors may arise during the shrink-fitting and tack-welding process, which may lead to added noise and vibration if the stator 109 and rotor 108 are not accurately aligned so as to achieve a uniform air gap 120. Accordingly, the relative uncertainties in the fabricated positions/orientations of the pump and motor components may lead to low overall production yield.

In addition, seam welding of the top cap 114 to the case 113 may present challenges in stability and consistency of the system during operation, particularly if the top cap 114 and case 113 are made of different materials. Though, even if the top cap and case are made of the same materials (e.g., thin steel), excessive heat that may arise during seam welding may cause damage to part(s) of the stator 109, for example, delicate winding and easily damageable electrical insulation.

Due to the eccentric shaft 104 and inherently unbalanced pressure loads during the rotation of the eccentric shaft, the motor and pump parts of the compressor of FIGS. 5-7 may tend to generate substantial levels of noise, in addition to the customary fluid borne noise during discharge (e.g., noise/vibration from high pressure gas exiting from the compression chamber through a valve). This relatively high level of noise and vibration may be partially due to the pump and motor being directly attached to a tight casing, with little to no space for noise and vibration dampening mechanisms.

The acoustic and vibrational energy from the motor and pump parts are in large part transmitted through structural members of the compressor. That is, if the stator and the casing are in intimate contact with each other (e.g., welded and/or shrink-fit together), noise generated in or by the stator may travel through the casing of the compressor via the contact points therebetween. Similarly for the pump part and the suction line connection, direct intimate and tight structural contact with the casing may provide easy transmission pathways for noise and vibration from the compressor into the surroundings. Thus, particularly for small, compact compressors, sound and vibration generated by the internal components of the compressor may be readily transmitted structurally through the casing to the surrounding air, attached plumbing, and the base to which the compressor is attached.

In some cases, a compressor may employ two pressure chambers within the casing, for example, one next to the other (not shown in the figures). Here, the inner cylinder may house the regular rotary compressor, where the pressure of the inner cylinder is kept at a pressure suitable for discharge. The outer cylinder may be kept at a pressure suitable for suction, and may be in communication with the suction port of the inner cylinder. The relatively high discharge pressure from the compression chamber may be routed out of the inner cylinder via a discharge tube extending through the outer cylinder, with sealed joints (e.g., by brazing).

In some cases, a motor pump assembly may be manufactured so as to float within the casing or otherwise be separated from (without a rigid connection) the casing at a pressure suitable for discharge. Alternatively, or in addition, a muffler may be used to mitigate noise/vibrations between the pump and the casing.

Aspects of the present disclosure provide for compact, lightweight, low-volume, low-profile, low-cost, noise and vibration reduction systems that can be incorporated into relatively small tight-fitting rotary compressor casings (e.g., existing rotary compressor configurations), with little to no need to increase the casing size or overall compressor weight during assembly or manufacture. Aspects of the present disclosure further provide a system that avoids heat-caused damage to the pump and/or the stator that may otherwise occur during welding processes.

Various embodiments of the present disclosure follow a number of general guidelines for reducing the structurally transmitted noise and vibration of the compressor. One general guideline is to employ various components (e.g., holders, buffers, damping materials) that provide separation or other methods of isolation of noise and vibration generating internal components (e.g., pump and motor) from each other and each from the casing. Such separation or isolation may occur through the use of appropriate interleaving parts (such as stator holder and pump holder) that exhibit relatively high transmission losses and/or damping. Another general guideline is to mitigate the structural transmission of noise and vibrations through the suction line connection via one or more novel configurations.

Figure 8A:
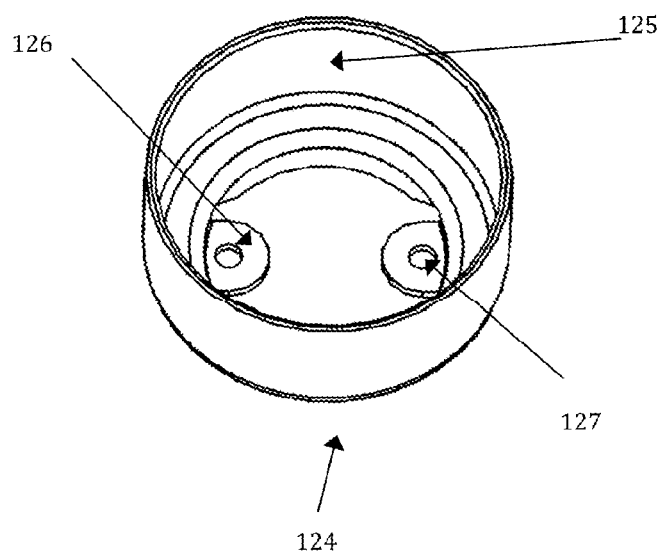
FIG. 8A illustrates a perspective view of a stator holder in accordance with an embodiment.
Figure 8B:
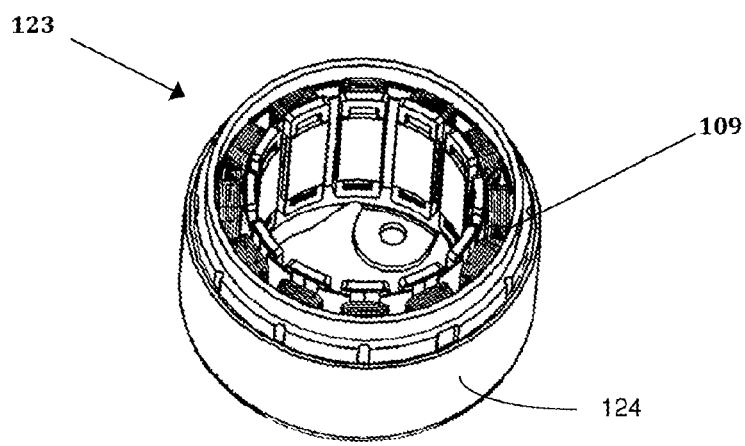
FIG. 8B depicts a perspective view of the stator holder of FIG. 8A with a stator in place.

FIG. 8A depicts an embodiment of a stator holder 124 and FIG. 8B shows a stator 109 held by the stator holder 124, in accordance with aspects of the present disclosure. The stator holder 124 may provide a physical separation or gap between the stator (hence, the motor) and the casing of the compressor. That is, the stator 109 is kept from direct contact with the casing 113. The stator holder 124 may thus provide an indirect structural transmission pathway for acoustic and vibrational energy from the stator by directing the acoustic and vibrational energy through the stator holder to the pump before reaching the casing rather than transmitting the acoustic and vibrational energy directly from the stator to the casing. That is, noise and vibrational energy that would otherwise travel from the stator to the casing gets re-directed to the pump and gets dampened in the process. As a result, the only remaining direct connections to the casing for the stator are the electrical wiring to the stator, and the attachment point(s) to the pump assembly via the stator holder. The stator holder 124 may be constructed and/or used with other damping components to exhibit a generally high impedance to the acoustic and vibrational energy transmission.

As provided in FIGS. 8A-8B, rather than shrink fitting the stator 109 to the compressor casing in the case of ordinary rotary compressors, the stator holder 124 may be used to mount the stator 109 on to the pump. Such a structural departure effectively re-directs the structural transmission of noise and vibration emanating from the stator 109 away from the casing and toward the pump. The stator 109 may be press-fitted or otherwise secured to the stator holding cover 125 (or cup).

The stator holder 124 may be constructed so as to take up mostly existing unused space within the compressor casing, located above the top flange, muffler and below the motor. Accordingly, in some embodiments, during manufacture and assembly, to accommodate the space occupied by the stator holding cup 125, the diameter of the casing may be enlarged by the thickness of the cup 125; or, if the radius of the lower part of the stator's outer diameter, where the stator holder attaches to the stator, is reduced by the thickness of the cup, the size of the casing may not have to be increased at all.

As shown, the stator holder 124 may have two small tabs 126, horizontally disposed, each with holes 127 that may be used to fasten the stator 109 to the pump assembly. When mutually attached to one another, the stator holder 124 and the stator 109 may combine to form a supported stator assembly 123. When assembled, rather than the stator and casing being firmly attached (e.g., shrink-fit) to each other, a physical gap is formed between the case 113 and the stator 109 through the use of stator holding cup 125. As a result, the noise and vibration that would otherwise be directly transmitted structurally from the stator 109 to the case 113 is now eliminated, or re-directed to the attachment point between the stator and the pump. That is, in this embodiment, the two small horizontal tabs 126 provide the only two structural pathways for noise and vibration generated in the stator 109 to be transmitted to the pump. In some cases, incorporation of a stator holder may simplify the overall compressor assembly process by accurately pre-positioning and pre-aligning the stator with respect to the rotor and the pump which eliminates the uncertainties of positioning and alignment due to shrink fitting of the stator into the casing and the tack welding of the pump to the casing, as previously described.

In some embodiments, washers, springs and other damping material/components may be optionally provided on either side of the tabs 126. Such damping components may have an impedance sufficient to substantially impede or otherwise reduce structural transmission of stress waves associated with acoustic and/or vibrational energy flow from the stator to the pump assembly. In some cases, the structure of the stator holder and/or damping components may serve to restrict transmission pathways, for example, via narrow structural components, having abrupt changes in areas or geometry of the pathways, choke points, reduced contact area and/or introduce sharp impedance mismatches at interfaces (e.g., using dissimilar materials).

In some cases, holes 127 in the tabs 126 may be larger than the diameter of the bolts that extend therethrough. For example, the holes 127 may be shaped such that no direct contact arises between the outer diameter of the bolts and the inner diameter of the holes. In some embodiments, the stator holder allows for insertion of structural damping material within or at the interfaces providing a vibrational and/or acoustic damping mechanism for the stator.

The stator holder may have any suitable size, shape and weight, depending on the type of compressor that is used. In some embodiments, the stator holder may be between 50 grams and 70 grams. For example, for 1.4 cc and 1.9 cc displacement compressors, the stator holder 124 may weigh approximately 60 grams.

Figure 9A:
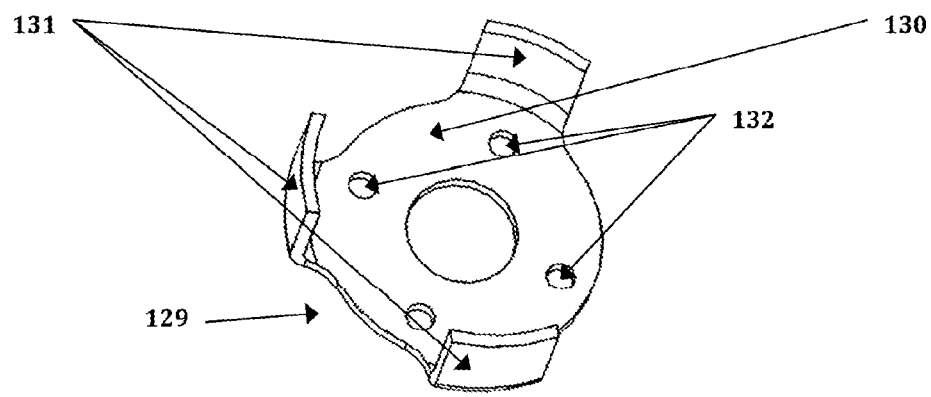
FIG. 9A illustrates a perspective view of a pump holder in accordance with an embodiment.
Figure 9B:
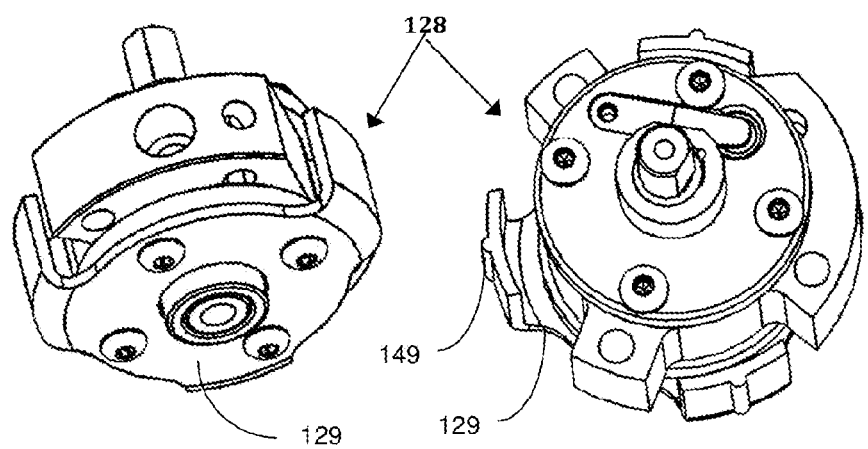
FIG. 9B depicts perspective views of the pump holder of FIG. 9A and a variation of the pump holder with a pump in place.
Figure 17:
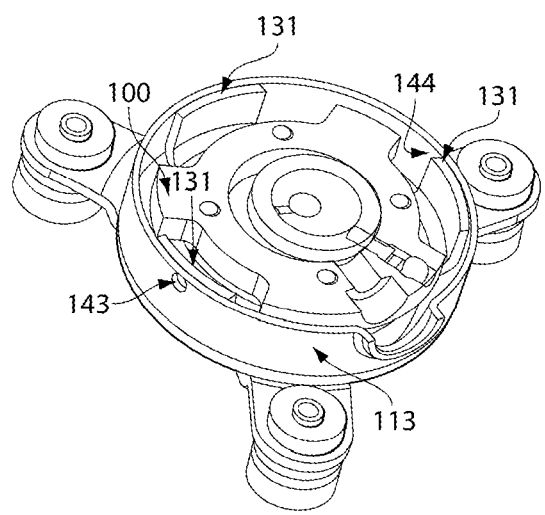
FIG. 17 illustrates a cut off top perspective view of a lower portion of a motor pump assembly showing attachment points to the casing in accordance with an embodiment.

FIG. 9A shows an embodiment of a pump holder 129, and FIG. 9B shows a pump held by the pump holder 129. The pump holder 129 provides physical separation between the side of the pump and the casing of the compressor. It may be attached, for example, to the bottom of the pump as shown in FIG. 9B. Or, it may also be attached to the top of the pump holder or any other appropriate location of the pump and, for example, be positioned upside down. The peripheral legs of the pump, an embodiment of which is shown in FIG. 17, may be used to attach the pump, or motor pump assembly, to the casing. Accordingly, the pump holder may act as a buffer for noise and vibration between the pump and the casing. Similar to the arrangement provided by the stator holder, the pump holder may also accommodate additional damping components that serve to increase overall vibrational, acoustic and thermal impedance.

As shown, the pump holder 129 has a relatively thin, flat base 130 and a number of thin and narrow coupling members 131, provided as vertical tabs or upright members, located at the periphery of the base. In this embodiment, three coupling members 131 are provided, though, it can be appreciated that any suitable number of structural members may be provided in any suitable configuration. The base 130 together with the coupling members 131 form the supported pump 128 shown in FIG. 9B.

Rather than the pump being tack-welded to the compressor casing, in this embodiment, the pump is not directly attached to the casing. Instead, the pump may be attached at the base of the pump holder, and the coupling members 131 may be welded, fastened, press-fitted, interference fitted or otherwise joined to the casing. For example, the coupling members 131 may be welded at low heat to the casing.

In some embodiments, as an alternative to tack-welding of the coupling members 131 as a method of securing the pump holder to the casing, the coupling members 131 may include certain coupling features, for example, protrusions or a ribbed surface 149 that allows for the pump holder to be press-fit into the space defined by the casing. Such a configuration may also serve to prevent or otherwise mitigate direct structural transmission of noise and vibration emanating from the pump to the case. Such protrusions or ribbings on the coupling members 131 may have suitable dimensions and can be easily incorporated into a manufacturing process (e.g., stamping) of the pump holder. Such a configuration allows the pump holder to be heat shrink fitted, press-fitted, or interference-fitted into the case.

It may be advantageous to eliminate the use of tack-welding between the coupling members of the pump holder and the casing. For example, this alternative method that employs protrusions or ribbing may reduce the total contact area between the coupling members 131 and the casing, resulting in a higher impedance and, thus, less transmission of acoustic and vibrational energy at the interfaces of the pump holder and the casing.

In various embodiments, the pump holder 129 may utilize existing and unused space within the compressor casing below the bottom flange, between the pump and the case 113 and above the oil sump 118 and therefore does not require enlargement of the diameter or the height of the compressor case 113. The outer diameter defined by the coupling members 131 may be similar to the outer diameter of the pump cylinder that would typically be welded to the case. Accordingly, because the cylinder is no longer used for tack welding as shown in this embodiment, the outer diameter of the cylinder may be reduced, further reducing the overall weight of the cylinder.

As further shown, in this embodiment, the pump holder 129 has four holes 132 in the flat base 130, which may be used to fasten (e.g., via bolts) the bottom of the pump to the case 113. As discussed above, the coupling members 131 around the perimeter of the pump holder may be used as attachment locations to the case 113. The coupling members 131 of the pump holder 129 may be attached by any suitable member, for example, welding, fastening, shrink-fit, interference fit, or press-fit.

As a result, most of the direct noise and vibration transmitted structurally from the supported pump 128 to the casing may be largely eliminated due to the physical separation gap between the casing and pump 128, instead of being firmly attached to one another in the state of the art rotary compressor. The noise and vibration generated by the pump 128, in addition to noise and vibration that were transmitted to the pump 128 from stator 109 first have to travel through the bolt connections through four holes 132, which may introduce a substantial level of impedance between the bottom of the pump 128 and the flat base 130 of the pump holder 129. The noise and/or vibrational energy then follows the confined and restricted structural pathways to the casing to which the pump 128 is fastened.

In some embodiments, the four holes 132 are larger than the diameter of the bolts that go through to attach the pump holder 129 to the casing such that there is no direct contact between the outer diameter of the bolts and the inner diameter of the holes. Similar to other connection points noted above, for example, shown in FIG. 11, the four bolt hole connections may have optional washers and dampers further introducing high impedance in order to further reduce the transmission of acoustic, vibrational and thermal energy between the pump 128 and the case 113.

In some cases, the optional buffer inserts/washers (e.g., energy absorbing materials) can be inserted between the bottom of the bottom flange 102 and the pump holder 129 as well as between the bolt head and the pump holder 129. In some embodiments, the base or other feature(s) of the pump holder 129 is shaped (e.g., radial, wavy patterns) so as to better resist distortions of the flat base 130 of the pump holder which may be caused by reduced welding heat or forces transmitted by the coupling members 131 into the case 113 during a press-fitting process for example.

In some embodiments, the case and the coupling members 131 of the pump holder 129 are made of the same material (e.g., stamped steel), and the capacity to retain heat of the coupling members may be smaller than the capacity of the case to retain heat. Thus, only a relatively small amount of heat may be required to weld the case 113 to the three coupling members 131, making it easier to for weld assembly to occur, in comparison to the welding process associated with welding of the case to the cylinder 100 or flanges 101 or 102, as is done during manufacturing of a state of the art rotary compressor. This results in strong, yet small points of contact, and with a decreased risk of damage/deformation due, for example, to overheating of the pump located above the pump holder 129. As a result, a much lower amount of heat may be applied as the coupling members are welded or otherwise coupled to the casing; thus, thermal distortions in the supported pump 128 may be virtually eliminated or reduced to trivial and inconsequential amounts, to the point that thermally induced deformations in the supported pump 128, if any, do not cause undesirable defects in the pump.

Such an arrangement where the pump holder is attached or otherwise coupled (e.g., fastened, or press-fitted) to the pump of the rotary compressor on one side and attached or coupled to the casing on the other side provides a number of advantages. For example, the pump holder serves to physically separate the pump assembly from the casing, for example, with an annular gap between the pump assembly and the casing, which may effectively remove most of the direct structural transmission pathway for acoustic and/or vibrational energy between the pump and the casing.

Employing the pump holder may also simplify the process of attaching the internal parts of compressor (i.e., pump assembly along with the motor) to the casing during compressor production. For example, the side of the pump is not required to be tack-welded to the casing. Rather, the pump holder can be welded or press-fit into the casing.

The pump holder may also function to reduce and/or impede the structural transmission of stress waves associated with acoustic and/or vibrational energy flow from the pump to the casing by having the pump holder designed to reduce the amplitudes of the transmitted stress waves and impose high impedance. The pump holder may function as a barrier to structural transmission of the acoustic and vibrational energy, through various methods, such as via design of the shape of the pump holder to use a thin material, create narrow and restricted transmission pathways, provide abrupt changes in areas or geometry of the pathways, provide choke points for noise/vibration transmission, reduce contact area and/or introduce sharp impedance mismatches at interfaces by using dissimilar materials. Similar advantages may also arise for the stator holder as well.

The pump holder may be made of a thin stamped steel and may have a flat bottom part that is attached/fastened to and becomes part of the overall motor pump assembly. Each of the connection points between the bottom of the pump holder and the casing may have a relatively small contact area, so as to act as a bottle neck or choke point to retard the transmission of acoustic and vibrational energy from the pump to the pump holder and case. In some embodiments, small and thin washers or inserts with serrated surfaces made of metal, polymer, composites may also be used to act as energy dampers or sources of impedance to transmission.

The pump holder may have any suitable size, shape, weight and configuration, depending on the type of compressor that is used. In some embodiments, the pump holder may be between 15 grams and 40 grams. For example, for 1.4 cc and 1.9 cc displacement compressors, the pump holder 124 may weigh approximately 25 grams.

Figure 10:
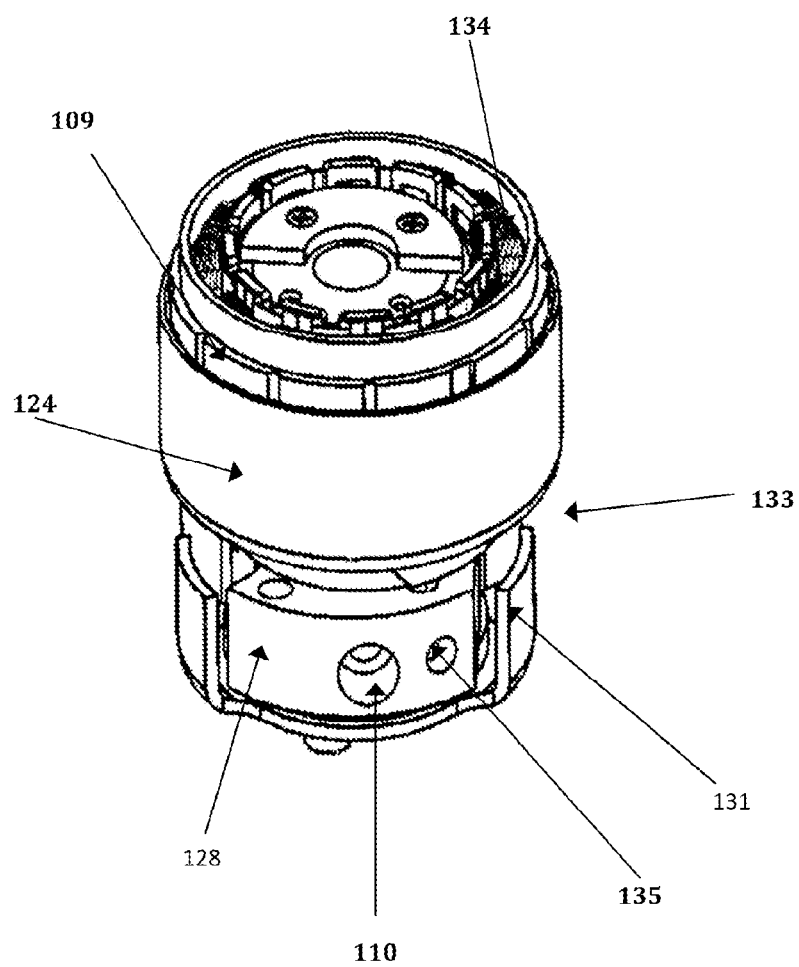
FIG. 10 shows a perspective view of a motor pump assembly in accordance with an embodiment.

FIG. 10 shows an illustrative embodiment of a motor pump assembly 133 with built in damping components, including the stator holder and pump holder. In this embodiment, incorporating the additional components does not enlarge the outer envelope of the motor pump assembly as compared to an assembly where the stator holder and pump holder are not provided. That is, the stator holder and/or the pump holder may be incorporated into motor pump assemblies that are fabricated for rotary compressor systems without requiring a larger casing or space than would be required as compared to existing compact rotary compressors of similar cooling capacity.

Here, the motor pump assembly 133 includes the supported stator assembly 123 of FIG. 8B and the supported pump 128 of FIG. 9B. That is, the motor pump assembly 133 includes all the customary parts of a rotary compressor pump parts plus the stator holder 124 and pump holder 129. The stator holder 124 and pump holder 129 may effectively provide a barrier for the stator and pump from the casing, so in this embodiment, the main body of the motor pump assembly is not in direct contact with the casing or its extensions, with the exception of the three attachment points (e.g., tack-welded points or three protrusions 149) of the three coupling members 131, electrical connection 134 to the winding of the stator 109, and the suction tube 111 connection at suction port 110.

As discussed, the three small, thin and narrow coupling members or tabs 131 of the pump holder 129 may provide respective points of attachment (e.g., tack-welding to the casing and its extension(s)). During compressor manufacturing process, the motor pump assembly 133 is first assembled with various components properly aligned and arranged. The motor pump assembly is then inserted into the case, for example, to be tack-welded following standard assembly processes of state of the art rotary compressors, or using other methods described above such as press-fitting. In this embodiment, during tack-welding of the case and the three small coupling members 131, a generally small amount of heat is needed and transmitted to the pump, keeping intact the integrity of the aligned components and precision machined parts of the pump. Accordingly, such an arrangement may substantially reduce overall risks of manufacturing fall-outs.

As discussed herein, the stator holder 124 and pump holder 129, incorporated within the motor pump assembly 133 may accommodate various levels of built-in vibrational damping and acoustic attenuation mechanisms depending on the requirement of the intended applications, as well as thermal buffering functions. For instance, by incorporating the stator holder and pump holder, the amount of welding heat transferred from the casing to any part of the motor pump assembly is significantly decreased, thereby reducing and virtually eliminating the risk of damage to any critical precision parts and, thus, lowering manufacturing fallouts during compressor manufacturing and ensuring high levels of compressor performance with narrow variations among compressors thus produced.

Further, the presence of the holders simplify the alignment of various compressor pump and drive parts during the assembly process. Lower levels of vibrational and acoustic energy is also transmitted from the motor pump assembly 133 to the casing because the transmission path is directed through the stator holder, pump, and then through the pump holder, giving rise to lower noise and vibration levels during compressor operation. The introduction of such embodiments of the motor pump assembly also has little to no appreciable adverse impact on the size of the casing, overall weight, and overall cost for the overall rotary compressor, as compared to state-of-the art rotary compressors.

As discussed above, without substantially increasing or altering the weight and size of the overall compressor, the use of these slim and lightweight add-on components, stator holder 124 and pump holder 129, along with various optional washer and damping parts used for pump and the stator at the same time accomplishes an effective global isolation of the noise and vibration generating internal parts (i.e., pump and motor), collectively called the motor pump assembly 133, from the case 113, with the exception of the remaining transmission path through the suction line connection.

Now, most of the combined energy from the high frequency noise and vibration from the motor stator 109 and also from the supported pump 128 is borne and modified by the entire mass/inertias of the motor pump assembly 133, in terms of frequency and amplitude. The energy will then be transmitted to the case 113 through the pump holder 129, which itself is designed to be a significant barrier to transmission of the energy, and also an energy dissipater, for example, if damping material is inserted in combination with fasteners (e.g., screws, bolts, washers, etc.). For example, relatively high frequency noise and vibration becomes modified and attenuated by the larger mass and inertia of the motor pump assembly. In the same fashion, noise and vibration generated from the pump may be modified, attenuated and/or dissipated in the damping material. This is in sharp contrast to the state of the art rotary compressor designs where noise and vibration emanating from the stator or the pump is directly transmitted to the case wall where the stator or the pump directly touches the case (e.g., through welding), without any substantial attenuation, such that noise and vibration are broadcasted at full strength.

Figure 11:
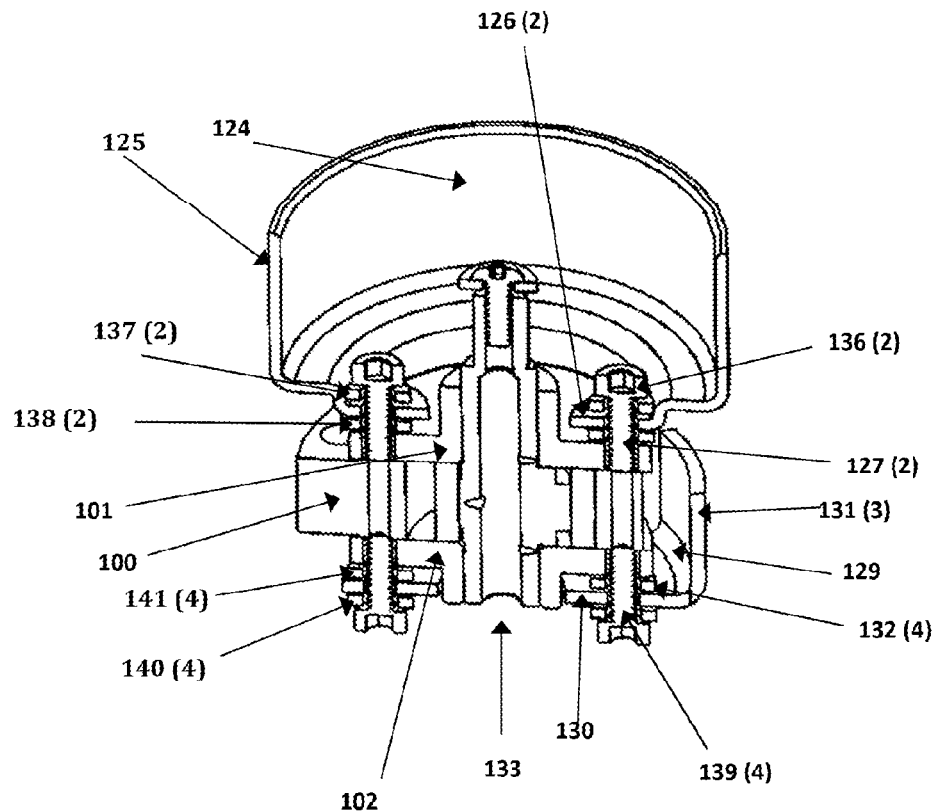
FIG. 11 illustrates a partial perspective view of a motor pump assembly with washers and spacers for increased reduction of noise and vibration in accordance with an embodiment.

As noted above, for some embodiments, a number of washers and dampers may be optionally installed with the stator holder and/or pump holder, to increase impedance to transmission of acoustic, vibrational, and thermal energy and, hence, promote dissipation of energy. FIG. 11 shows an embodiment that illustrates various modes of dissipation and transmission of energy within the motor pump assembly 133.

The acoustic and vibrational energy generated in the stator 109 (not shown in FIG. 11) is directly transmitted to the cup 125 of the stator holder 124, then travels down to the base of the cup 125, and then makes two 90 degree turns into the two small tabs 126, where transmission is limited due to high levels of impedance therethrough. As further shown, the acoustic/vibrational energy then travels through the two sets of washers/dampers 137 to the head of the two bolts 136 and through two washers/dampers 138 to the top of the top flange 101, each transmission interface and pathway having abrupt impedance discontinuities.

Due to high impedance transmission paths inside the stator holder and then through the two sets of washers/dampers with abrupt impedance discontinuities at the interfaces, the acoustic and vibrational energies are reflected, dissipated and mitigated before being transmitted to the pump. In various embodiments, the pump constitutes the bottom side of the motor pump assembly 133, where similar energy dissipation and mitigation occurs on account of the pump holder 129.

Referring to FIG. 11 again, the acoustic and vibrational energies originated and subsequently transmitted from the stator 109, and the noise and vibrational energies generated within the pump itself may flow through two paths: one path is from the heads of the four bolts 139 that are screwed to the cylinder 100 to the four sets of washers/dampers 140 to the thin base 130 of the pump holder 129, experiencing high impedance within its thin base 130. The energies are further dissipated and attenuated passing through the washers/dampers that have very small contact areas and high damping capabilities. Another transmission pathway is from the bottom of the bottom flange 102 through four sets of washer/dampers 141 to the base 130 of the pump holder 129. Once reaching the base 130 of the pump holder 129, acoustic and vibrational energies will spread and propagate throughout the base 130 and then make a 90 degree turn at narrow choke points located at the necks of the three vertical tabs 131 in the periphery, where the impedance suddenly increases at the necks of the tabs 131, decreasing the transmission of energies. When the three tabs 131 are tack-welded to the case or otherwise connected, for example, as a keyed groove within the case, bolted or screwed, etc., the acoustic and vibrational energies are transmitted to the case 113 (shown in FIG. 17) via another set of impedance discontinuities between the tabs 131 and the case 113 (also shown in FIG. 17).

The use of multiple sets of washers/dampers for each bolt described above would further increase the dissipation and impedance to transmission of energies and reduce the transmission of noise and vibration from the bottom flange to the pump holder, particularly if an energy dissipating material such as polymeric material or dead steel is used as part of the fastening components. This embodiment is a significant departure from the state of the art practice of welding the pump to the casing and shrink fitting the stator into the casing.

Embodiments of compressors manufactured according to the present disclosure, without the optional washers/dampers, are able to achieve a significantly low level of noise, for example, of approximately 40 dB at 90 cm at 60 Hz even without the use of any muffler to reduce the discharge noise the reduction of which is not a necessary aspects of the present disclosure. This is about a 14 dB reduction in noise as compared to state of the art rotary compressors.

As noted above, additional damping components may be used in cooperation with the stator holder and pump holder. These additional damping components, as well as the stator holder and pump holder may utilize and include any suitable material so long as they are compatible with the overall environment inside the compressor. For instance, such components may be made of stamped steel or materials other than stamped steel, such as cast metals (e.g., cast iron), dead steel, sintered metal (e.g., powdered), copper, stamped aluminum, polymers, elastomers, composites, etc., or combinations thereof. In some cases, one or more viscous, viscoelastic or frictional damping materials may be inserted at interfaces between the stator holder and the pump holder. Such materials may be compatible with refrigerants and the conditions associated therewith.

In addition to the measures described herein for reducing noise levels, other methods of reducing noise may be employed. For example, it may be possible and preferable to use a Helmholtz resonator, mufflers, filters, etc. and/or other methods to reduce noise transmission of the compressor to further reduce the noise and vibration stemming from discharge and suction process.

By introducing the above noise/vibration mitigation systems in which the motor and pump are substantially isolated/buffered from the casing, the suction tube 111 remains as the only remaining structurally solid pathway between the internal source of noise and vibration and the case 113. Embodiments of the present disclosure also include configurations of rotary compressors where noise and vibration associated with connection to the suction tube may also be reduced.

Figure 12:
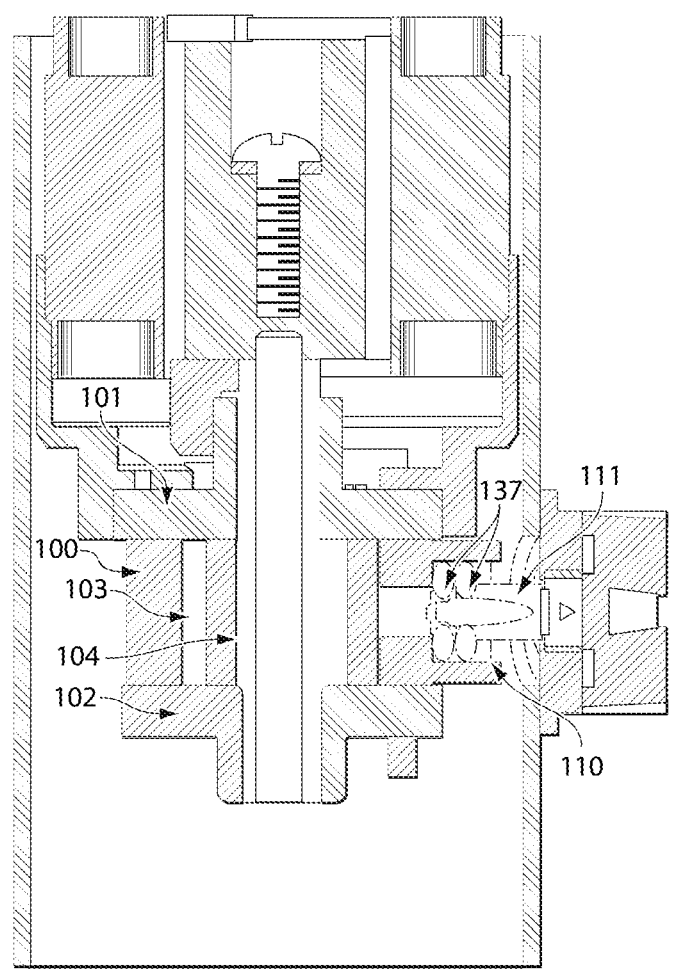
FIG. 12 depicts a cross-sectional view of a rotary compressor with a suction line connection arrangement with a polymeric seal in accordance with an embodiment.

In some embodiments, the region around the suction connection may be modified with various damping materials, such as a suction collar, polymeric ring seals, rotary seals, washers, o-rings, etc. FIG. 12 illustrates an embodiment of a suction line connection that includes a polymeric o-ring seal for the suction tube. This is in contrast to the use of an oversized steel suction collar, which may more prone to transmit acoustic and vibrational energy due to the suction collar and the suction tube forming a solid metallic seal against the suction port 110 of the cylinder 100.

Here, the suction tube is not rigidly attached to the pump assembly and, as a result, structural transmission paths now include a polymeric O-ring seal between the motor pump assembly and the casing, resulting in overall lower noise and vibration transmission than would otherwise be the case. In this embodiment, a suction tube 111 is inserted into the cylinder port with a polymeric ring(s) 137 used to seal the suction tube against the inner diameter surface of the cylinder 100's suction port 110 resulting in non-structural, non-rigid connections with high transmission loss for both vibrational and acoustic energy.

Figure 13:
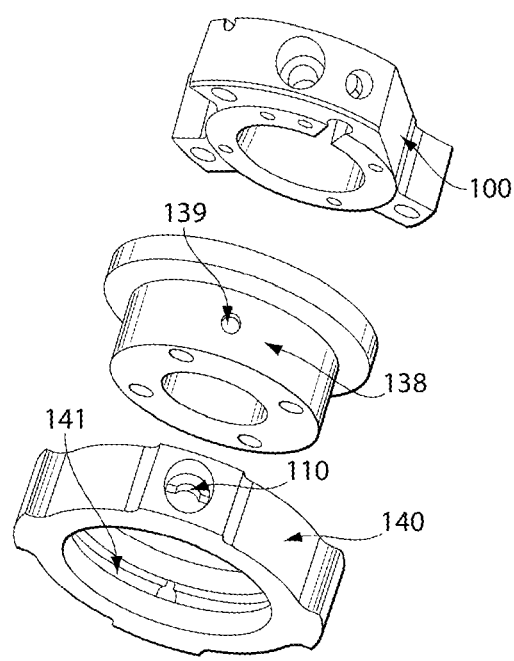
FIG. 13 shows a partial perspective view of another suction line connection arrangement with a rotatable interface in accordance with an embodiment.

FIG. 13 shows another embodiment of a suction line connection to reduce the noise and vibration, where the suction line is connected to an annular cavity shaped suction plenum that is in rotating contact with the pump and the plenum is in communication with the suction side of the compressor within the motor pump assembly. Here, a suction plenum ring 140 (or outer support) and a modified bottom flange 138 (or inner support) are provided. The suction plenum ring 140 may be paired or otherwise coupled with the pump holder 129 whose coupling members 131 may be tack welded or otherwise attached to the case 113. The suction tube 111 may be mechanically expanded onto the suction port 110 of the suction plenum ring by pushing in the suction collar 112 to form a seal between the suction port 110 and the outer surface of the suction tube 111. Suction gas may be fed to suction plenum 141 (an annular cavity for this embodiment) within the suction plenum ring 140 through the suction port 110.

In this embodiment, a manifold/plenum 141 is fed by the suction line and is in communication with the inlet port of the pump through a rotating contact interface. This rotating contact interface acts as a seal, including oil lubrication at the interface.

The motor pump assembly 133 may now include a stator 109, stator holder 124, pump with a modified bottom flange 138, suction plenum ring 140, and pump holder 129 supporting the suction plenum ring 140. Sealing between the modified bottom flange 138 and the suction plenum 141 may be accomplished by a tight radial clearance and lubricating oil in the radial clearance.

In this embodiment, the entire motor pump assembly 133 may now be free to rotate in relation to the suction plenum ring 140, which is secured by the pump holder 129 which is, in turn, secured to the case via the coupling members 131. The suction plenum 141 is in communication with the suction side of the compressor within the modified motor pump assembly 133 through the suction hole 139 drilled on the vertical circumferential face of the modified bottom flange 138. In this case, a centering spring (not shown in the figures) may be provided between the motor pump assembly 133 and the suction plenum ring, the case, or any fixed point within the compressor to ensure that the modified motor pump assembly 133 is rotationally centered.

Figure 14:
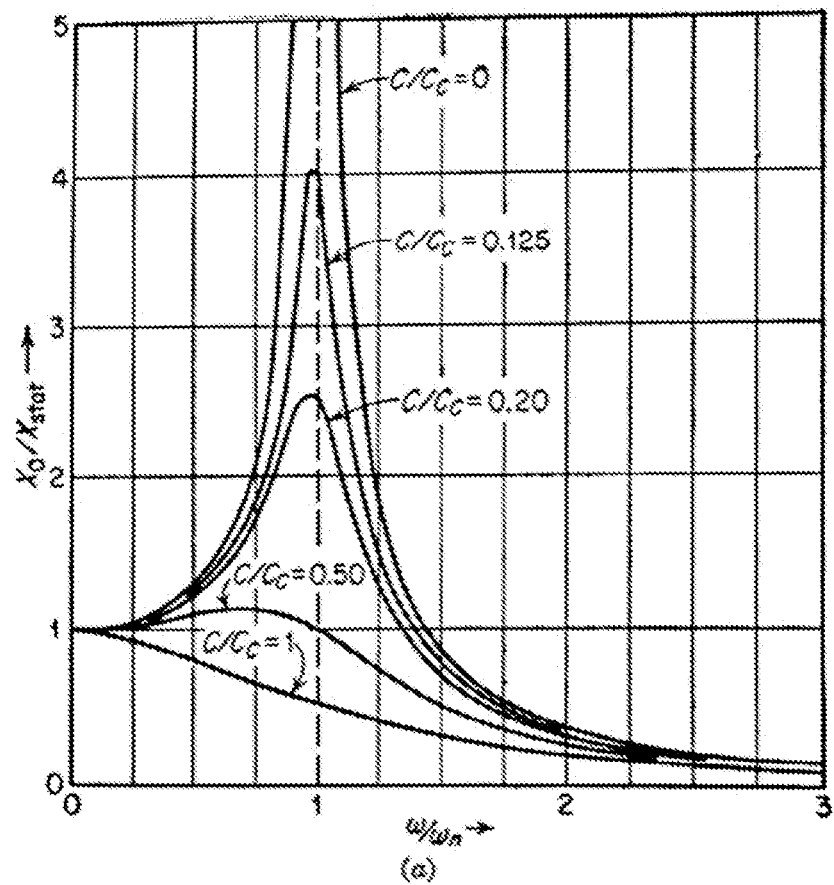
FIG. 14 shows a graph that illustrates vibration amplitudes of damped forced vibration systems including a critically damped system.

Frictional/viscous damping may be provided at the interface between the inner diametric surface of the suction plenum ring 140 and the modified bottom flange 138. By designing in the proper damping (e.g., spring), to accommodate the moment of inertia of the rotationally oscillating motor pump assembly with respect to the frequency of the oscillations forced by the operational speed of the compressor, one can achieve near critical damping to limit the angular displacement of the motor pump assembly to a minute level (e.g., a few microns at the circumference of the stator) while providing critical damping to dissipate the energy of the vibration. This ensures that the integrity of the electrical connection 134 of the motor pump assembly of FIG. 10 (not shown in FIG. 13) to the stator 109 will be preserved during the life of the compressor As generally known to those of skill in the art, a critically damped system is one that suppresses undesirable oscillations. For example, FIG. 14 shows a graph that generally shows a system that is critically damped in comparison to systems that are only partially damped. As shown, when the frequency $\omega$ is operated at resonant frequency $\omega_o$, for a system that is not critically damped, $C/C_c=0$, the amplitude increases significantly; though, for a system that is critically damped, $C/C_c=1$, the amplitude is not observed to increase appreciably. For embodiments discussed herein, a critically damped forced oscillation system may include a forced vibration system with spring, inertia, damping components and having critical damping resulting in minimal oscillation amplitudes in forced oscillation in the forced input frequency range of interest.

By carefully designing the components of the pump motor assembly and spring, damping and moment of inertia parameters to approach critical damping, the embodiment shown in FIG. 13 enables the compressor's entire internal component (pump motor assembly 133) to be isolated from the casing without any solid or rigid structural connection to the casing, to reduce the noise and vibration of a rotary compressor to extremely low levels hereto unachievable. In addition, such isolation may be achieved without any need to increase the size of the casing or require expensive parts or processes for manufacture.

Figure 15:
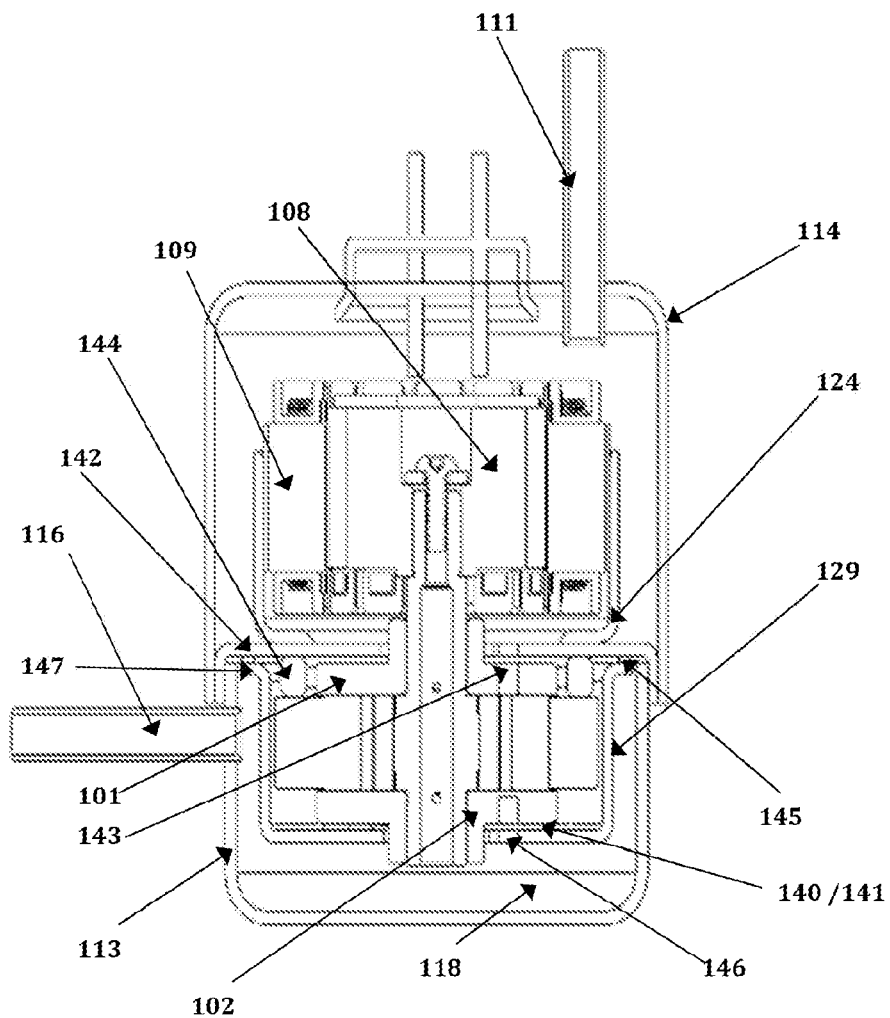
FIG. 15 illustrates a cross-sectional view of yet another suction line connection arrangement in accordance with an embodiment.

FIG. 15 illustrates another embodiment of a rotary compressor having a modified suction line configuration, configured to reduce the noise and vibration. In this embodiment, the compressor includes a pressure separation member (e.g., separation cap 142) that divides the interior of the casing into two different pressure spaces, one kept at suction pressure (provided at the suction line 111) and the other kept at discharge pressure ported to the discharge tube 116. One of the pressure regions is enclosed by the pressure separator cap and the top cap, and the other pressure region is enclosed by the pressure separator cap and the case. Such an embodiment is a departure from common practice in state of the art rotary compressors, at least in part, because neither the discharge line nor the suction line is physically connected to or touching respective ports of the pump assembly.

As shown in FIG. 15, the space within the casing is divided into two different pressure regions: one region on top is formed by the pressure separator cap 142, polymeric seal ring 144, top surface of the pump 128, and the top cap 114. The suction tube 111 introduces the suction gas directly into the suction pressure region, and the other region at the bottom is formed by the pressure separator cap 142, polymeric seal ring 144, the bottom and side surfaces of the pump 128 and the case 113 and kept at discharge pressure (higher than the suction pressure) and ported to the discharge tube 116. The suction port connection for returning refrigerant and oil is through a suction hole 143 through the top flange 101 and then cylinder 100, which internally leads to the suction port (not shown) of the cylinder 100 and the compression space.

The pressure separating cap 142 has a large enough hole at the center to pre-install the motor pump assembly 133 in such a way that the periphery of the top flange or the top of the cylinder is sealed against the pressure separating cap 142 using a sealing ring 144 or washer made of flexible and/or energy absorbing/damping material between the top flange and the pressure separating cap. The rotor 108 and the stator 109 are located in the suction pressure space at a relatively low temperature which may help increase the overall motor electrical efficiency. The top flange 101 of the pump faces the suction pressure space and has the suction hole 143 leading to the suction port of the cylinder within the pump 128. The discharge port 146 is moved to the bottom flange 102, and the lower portion of the motor pump assembly 133 is exposed to the discharge pressure.

In this embodiment, the motor pump assembly 133 is attached to the pressure separating cap 142 using both the stator holder 124 and the pump holder 129, with the latter modified appropriately to have three horizontal tabs 147 (rather than upright coupling members) for fastening to the pressure separating cap 142 instead of attaching to the inner diametric surface of case 113.

In this embodiment, the four sets of washers/dampers 140 and 141 can be used as before between the pump 128 and the pump holder 129. In addition, there is another opportunity to insert more sets of washers and dampers 145 between the pump holder 129 and the pressure separating cap 142, increasing the possibility of further reduction of noise and vibration.

This embodiment provides a number of advantages. For example, the acoustic and vibrational transmission paths are longer and more tenuous, resulting in lower overall noise and vibration ultimately emanated from the compressor. Further, the pressure separating cap 142, the top cap 114 and the case 113 can be seam welded in one welding operation during assembly to simplify the compressor manufacturing process. That is, there is no more tack-welding process necessary to attach the tabs of the pump holder to the case in this embodiment since that is done by fastening the tabs to the pressure separating cap by bolts or screws with optional washers. In addition, the oil sump 118 is in the discharge pressure space, similar to state of the art rotary compressors, utilizing the same oil pumping and lubrication mechanisms and principles. Since it is with the help of the discharge pressure that the lubricating oil gets pumped into the compression chamber and lubricate all the moving parts, the lower compartment containing the pump is also kept at discharge pressure, as in this embodiment.

In addition to the above advantages, rotary compressors according to this embodiment may be useful for heat pump applications or high pressure, high temperature refrigerants such as $CO_2$, for example, due to the fact that the motor rotor magnet and stator winding insulation are protected from high temperature induced degradation or damage. Electrical efficiency of the motor is also expected to be higher since the winding will be at lower temperatures and thus lower resistance.

In some cases, most of the pump, with the exception of the top flange and above is exposed to the discharge pressure. This is in sharp contrast to the state of the art rotary compressors, wherein the entire internal space of the pump is exposed to discharge pressure and temperature. The embodiment of the pressure separating cap shown in FIG. 15 resembles an upside down shallow cup with a hole at the center. In some embodiments, this pressure separating cap 142 can be made of a stamped sheet steel.

In various embodiments of the compressor design shown in FIG. 15, the motor pump assembly 133 may be secured to the bottom side of the shallow cup-shaped pressure separating cap 142 through the pump holder 129, and the annular ring seal 144, which may be made of polymer and/or other materials that may serve as an effective barrier for transmission of noise and vibration while also functioning as a rotary vibrational damper. The pump holder 129 may also be used to secure the motor pump assembly 133 to the pressure separator cap 142, for example, with spring loaded and serrated fasteners with an optional provision to allow rotational freedom of the motor pump assembly 133 to make the entire system optimally and near critically damped. As discussed above, when critically damped, minimal rotational movement occurs of the motor pump assembly, while achieving a desired degree of damping of the oscillation.

The annular ring may be placed between the pressure separating cap 142 and the top flange 101 or cylinder 100 to act as a seal between the two pressure compartments and also a barrier against transmission of noise and vibration between the motor pump assembly 133 and the pressure separating cap 142. Now, the pressure separating cap 142 with the motor pump assembly 133 installed onto it will be pressed onto the case 113. The circumferential lip of the upside down cup of the pressure separating cap 142 will act as the welding seam. Next, the top cap 114 may be pressed onto the pressure separating cap 142 to align with the lip of the pressure separating cap 142 forming two welding seams that can be welded in a one seam welding process joining three layers (case 113, pressure separating cap 142, and top cap 114) of thin steel sheets all at once. This way, only one welding process will be needed during manufacture, as opposed to two or three welding processes currently used (tack welding to join the pump to the case, seam welding to join the case and the top cap, and the seam welding to join the bottom cap to the case) for state of the art compressors today.

As an off shoot of the above embodiment, a rotary compressor can be produced by having the pump holder with a provision to securely attach the motor pump assembly 133 to the compressor case in such a way that would eliminate the need for tack-welding of the tips of the pump holder to the case by extending the tabs to near the top of the case and attaching them to an attachment ring similar in shape to the pressure separator cap of 142, but without a sealing ring. In assembly operation, the top cap 114, the attachment ring (not shown) and the case will be seam welded in one welding operation. Since the tabs 147 of the modified pump holder 129 will be connected to the attachment ring with optional washers and dampers, the transmission path could be torturous and of higher transmission impedance resulting in even lower noise and vibration.

Figure 16:
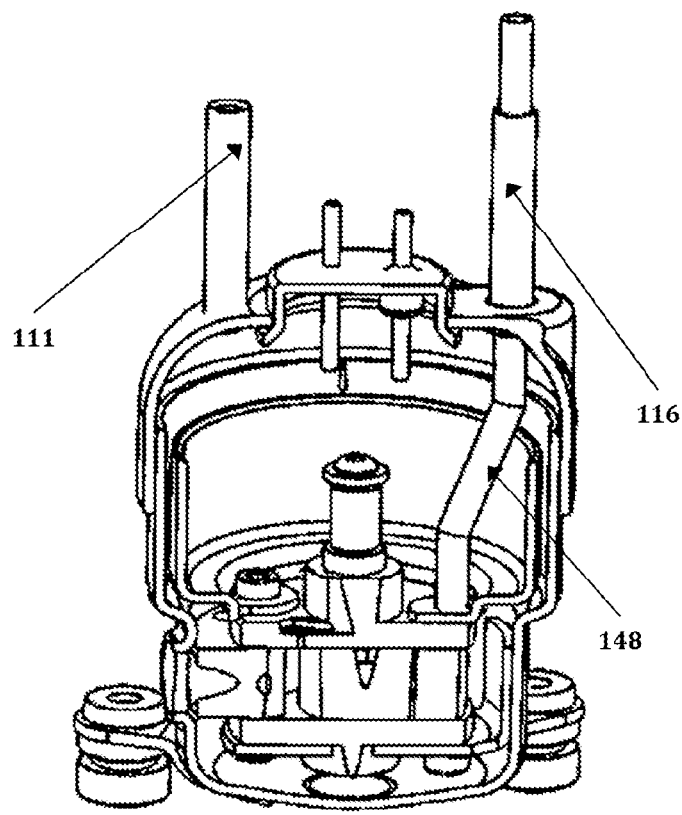
FIG. 16 shows a partial perspective view of another suction line connection arrangement in accordance with an embodiment.

FIG. 16 illustrates another embodiment of a rotary compressor showing the space interior to the casing at suction pressure, by routing the discharge gas directly to the outside of a quiet and compact rotary compressor with motor pump assembly. Here, the interior of the casing is maintained at suction pressure by having the discharge line connected directly to the discharge port and brazed to the casing. In this embodiment, while still utilizing the motor pump assembly approach, one can go back to the single pressure space within the casing with one notable difference: now the entire space within the casing will be maintained at suction pressure by routing the discharge gas into a thin discharge tube 148, similar to reciprocating compressors, and out of the casing where the thin discharge tube 148 is brazed to the larger diameter discharge tube 116 externally. In this embodiment, the suction gas comes in through suction tube 111 into the top of the casing to maintain low stator winding temperature for improved motor efficiency. Any adverse effect of heating the suction gas by the motor may be more than compensated by increased motor efficiency. The key difference here is that this can be achieved without having to increase casing dimensions much, if at all, at least in part because most of the energy damping and dissipation has been done inside the motor pump assembly 133.

However, this embodiment may require reinforcement of the oil pumping mechanism to make sure that the oil pumping mechanism can overcome the opposing pressure force from the compression space which will have higher pressure than the oil sump during most of the operational cycle. This variation for a quiet rotary compressor combines most of the advantages of motor pump assembly with its compact acoustic, vibrational and thermal impedances embedded and the additional advantage of running the motor in relatively low temperature space to maintain high electrical efficiency. In this embodiment, the discharge tube is directly connected to the discharge port.

In some embodiments, a rotary compressor with just the stator holder used but without the use of the pump holder may still exhibit advantages, such as less manufacturing fall-outs during seam welding, and without noise and vibration structurally transmitted directly from the stator to the casing.

FIG. 17 illustrates an embodiment of a semi-quiet rotary compressor with only the pump holder 129 used, yet without using the stator holder 124. Such an embodiment, will also still have advantages of less manufacturing fall-outs during tack welding, less noise structurally transmitted directly from the pump to the casing and to the surrounding air still without increasing the casing size but with the possibility of reduced weight since one can cut off large metal parts from the cylinder that were used to tack weld the case to.

Compressor systems in accordance with the present disclosure may exhibit advantageous performance characteristics. As discussed above, embodiments of compressors may have a relatively high cooling capacity, given a small weight and/or volume, yet may also generate low amounts of noise and vibration. Accordingly, the casing used for motor pump assemblies that do not incorporate certain features highlighted herein (e.g., stator holder, pump holder, additional damping components, unique suction line connection) need not be enlarged or appreciably changed to accommodate motor pump assemblies that do not incorporate such features.

Rotary compressors described herein may exhibit a suitable gravimetric cooling capacity density. In some embodiments, the compressors may be observed to have a gravimetric cooling capacity density of greater than 50 W/lb, greater than 100 W/lb, greater than 150 W/lb, greater than 200 W/lb, greater than 250 W/lb, or greater than 300 W/lb (e.g., between 50 W/lb and 350 W/lb, between 100 W/lb and 300 W/lb, between 150 W/lb and 250 W/lb, between 150 W/lb and 200 W/lb, or between 200 W/lb and 250 W/lb). Values of gravimetric cooling capacity density that fall outside of the above-noted ranges may also be possible. As provided herein, the gravimetric cooling capacity is determined by first measuring the cooling capacity of the compressor at the following operating conditions where each of the temperatures provided are at steady state within a refrigeration system, as known to those of ordinary skill in the art: condensing temperature of 120 degrees F., evaporating temperature of 45 degrees F., superheat of 10 degrees F., subcooling of 10 degrees F., and an operating speed of the compressor of 3600 RPM. This cooling capacity is then divided by the total weight of the compressor to determine the gravimetric cooling capacity. Similarly, rotary compressors of the present disclosure may exhibit a suitable volumetric cooling capacity density. In some embodiments, the compressors may be observed to have a volumetric cooling capacity density of greater than 10 W/in$^3$, greater than 20 W/in$^3$, greater than 30 W/in$^3$, or greater than 40 W/in$^3$ (e.g., between 10 W/in$^3$ and 50 W/in$^3$, between 20 W/in$^3$ and 40 W/in$^3$, between 25 W/in$^3$ and 35 W/in$^3$). Compressors may also exhibit volumetric cooling capacity densities that fall outside of the above-noted ranges. As provided herein, the volumetric cooling capacity is determined by dividing the cooling capacity of the compressor by the external volume of the compressor, where this cooling capacity is measured at the conditions described above for the gravimetric cooling capacity. Rotary compressors described herein may generate a desired level of noise. In some embodiments, the compressors may be measured to generate a noise level of less than 60 dBA, less than 50 dBA, less than 45 dBA, less than 40 dBA, less than 35 dBA, less than 30 dBA, less than 25 dBA, or less than 20 dBA (e.g., between 20 dBA and 60 dBA, between 30 dBA and 50 dBA, between 30 dBA and 45 dBA, between 35 dBA and 40 dBA). Compressors may generate noise levels that fall outside of the above-noted ranges. As provided herein, noise levels are measured from a noise-level meter positioned 90 cm from the circumferential face of the compressor, where the compressor is operated at the conditions described above for gravimetric cooling capacity.

Compressors in accordance with the present disclosure may have a relatively high cooling capacity, given a small weight and/or volume, yet may also generate low amounts of noise and vibration. For example, compressors that one or more of the noise/vibration damping features discussed herein may exhibit a combination of performance characteristics, including a gravimetric cooling capacity density of greater than 100 W/lb (e.g., between 100 W/lb and 300 W/lb), a volumetric cooling capacity density of greater than 20 W/in$^3$ (e.g., between 20 W/in$^3$ and 40 W/in$^3$) and a noise level of less than 45 dBA at a distance of 90 cm (e.g., between 30 dBA and 45 dBA).

A number of examples will now be presented. A motor pump assembly 133 incorporating the stator holder and the pump holder, described above, was manufactured and observed to exhibit favorable noise characteristics. For instance, the rate of manufacturing fall-out was well below 1% during the initial production run, with the performance of all compressors residing within very narrow performance variations of +/−2.5%. In comparison, prior to the introduction of the stator and pump holders, performance variations of +/−7% was recorded and fall out rates of 3 to 7% were commonplace. In addition, a noise reduction of 14 dBA and a vibration amplitude reduction of approximately 50% was observed, in comparison to conventional rotary compressors. As provided herein, vibration amplitude is measured by providing an accelerometer at the perimeter of the compressor housing to measure the amplitude of vibration versus time at varying speeds of the compressor.

Figure 18:
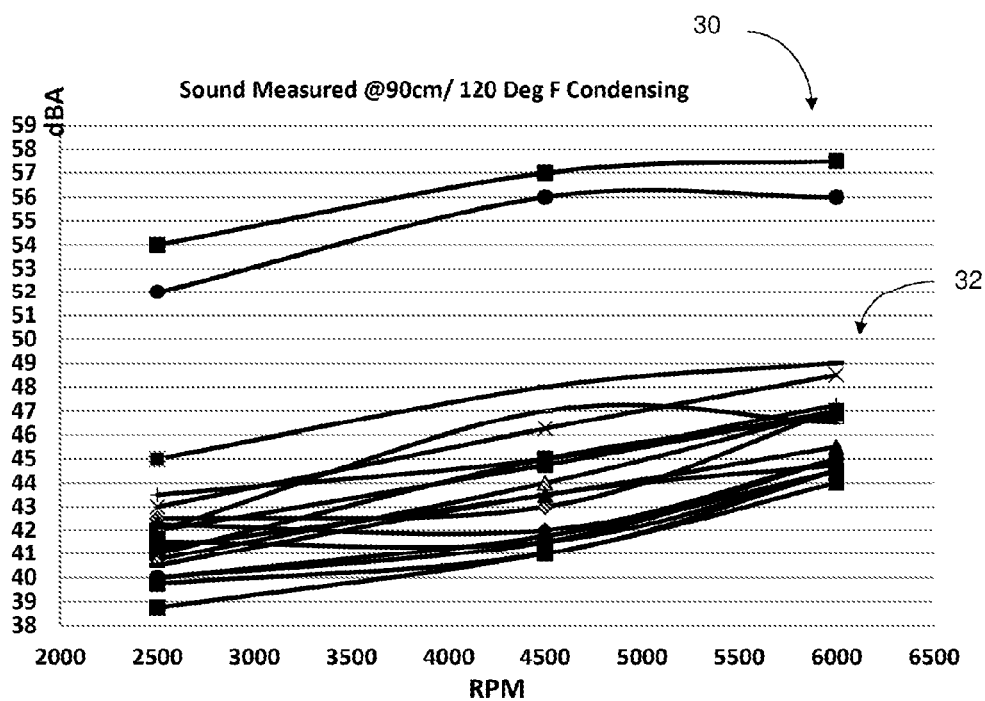
FIG. 18 depicts a graph comparing the level of noise of conventional rotary compressors and rotary compressors in accordance with various embodiments.

FIG. 18 presents graphs showing the level of noise for various compressors incorporating features of the present disclosure as compared with conventional rotary compressors. Curves 30 represent noise levels of state of the art 1.4 cc and 1.9 cc BLDC miniature rolling piston compressors without any modifications, showing relatively high levels of noise. For example, at 3600 RPM, the noise levels are 56 dBA and 54 dBA for 1.9 cc and 1.4 cc models, respectively. Whereas curves 32 contain 14 different data sets at various stages where various features of the present disclosure are incorporated into the compressor. In a compressor example where the motor pump assembly includes the stator holder and pump holder, without incorporating additional damping components (e.g., washers, dampers, etc.), and without any changes to the suction tube connection, the noise level at 3600 RPM was measured to be 41 dBA, representing 13 to 15 dBA reduction in noise. When other damping features (e.g., washers, dampers, suction line connections, etc.) are introduced into the compressor, the noise level is expected to be reduced even further.

FIG. 19 presents a table that shows the comparison of performance amongst a number of compact rotary compressors D, E employing the features of the present disclosure, as compared to other rotary compressors A and B, and a BLDC reciprocating compressor C. For a compact rotary compressor to be more widely used, it would be preferable for the noise of the compressor to be reduced from ~55 dBA at 60 Hz (i.e., 3600 RPM) and 90 cm to levels such as 35-40 dBA at 60 Hz (i.e., 3600 RPM) and 90 cm, without increasing the overall size or weight of the compressor.

Compressor A is a 1.4 cc miniature rotary compressor, without noise/vibration mitigation measures. The gravimetric cooling capacity density was measured to be approximately 249 W/lb and the volumetric cooling capacity density was measured to be approximately 33 $W/in^3$, which is comparable to various embodiments presented herein, for example, compressors C, D. The overall noise level at 60 Hz and 90 cm was measured to be approximately 55 dBA, which is higher than certain embodiments of the present disclosure.

Compressor B in FIG. 18 is a BLDC compressor that is considered too large for wide scale use. Compressor B employs a massive top flange, acting also as a holder for the stator, utilizing large and heavy metal components such as a heavy bottom flange, heavy cylinder, and tall casing. The top flange of compressor B weighs as much as 270 g, which is much heavier in comparison to a miniature rotary compressor, which has a top flange weighing only 30 g. Compressor B was measured to exhibit a noise level of approximately 42 dBA at 60 Hz and 90 cm, yet weighs about ~2.5 times more and is much bulkier than the more quiet miniature compressor. As shown, compressor B delivers substantially less cooling capacity than compressors D, E. In short, while compressor B exhibits a suitable level of noise, this comes at the cost of a drastic increase in volume and weight.

Compressor C is a quiet BLDC reciprocating compressor that has a relatively large housing compared to Compressors A and B (up to 18 times larger), to accommodate conventional methods of noise and vibration reduction, such as a long and flexible discharge line with spring cladding for support and damping, springs and dampers on support points, plastic bumpers, etc.

As shown, the cooling capacity per compressor volume of compressor A (miniature BLDC rotary compressor) was observed to be better than that of compressor B by a factor of about 6, and perform better than that of compressor C by a factor of about 18. In terms of cooling capacity per compressor weight, compressor A was observed to perform better than compressor B by a factor of about 5.5, and perform better than compressor C by a factor of about 11.

Compressors D and E represent compressors that incorporate minimal damping features described herein, including the most basic the stator holder and pump holder. As shown, the cooling capacity density per compressor volume observed for each of compressors D, E was observed to be better than that for compressor C by a factor of about 15 to 19, and better than that for compressor B by a factor of about 4.4~5.6, respectively. In terms of cooling capacity per compressor weight, compressors D and E were observed to perform better than compressor C by a factor of about 8.4~10, and perform better than compressor B by a factor of about 4.2~5.0. Thus, compressors D, E, which incorporate just the stator holder and pump holder features described above, and not the additional damping components or suction line connection configuration, still demonstrate substantial improvements in compact, lightweight, and quiet rotary compressors, for all sizes.

Aspects of the present disclosure may be applicable to a number of fluid displacement devices whose internal parts generate noise and vibration. For example, various embodiments may be based, for illustrative purposes, on a miniature rolling piston type refrigeration compressor for use with primary refrigerants as the working fluid, as used in vapor compression systems. The rotary type machinery in conjunction with the noise and vibration reduction system described herein will be especially useful for refrigeration systems where small size, high efficiency, high power density is prized as well as low noise and vibration. Exemplary applications include household appliances such as refrigerators, countertop water coolers and icemakers, compact room dehumidifiers, personal air conditioners, amongst others.

In mass production, these extremely compact and quiet miniature compressors will become fairly inexpensive due to their extremely small sizes (i.e., low materials cost and less finish machining and grinding needed), to usher in their uses in many applications such as household refrigerators, countertop appliances, and many others such as distributed super-efficient cooling systems hitherto not feasible due to historically high noise levels of conventional compressors.

Even though the above description of the present disclosure used a single cylinder version of rolling piston compressors as examples of various embodiments, the same present disclosure will equally apply to other rotary compressors such as rotating vane compressor, scroll compressor, screw compressors, swinging compressors, etc. of both single cylinder and twin cylinder varieties for similar objectives.

As discussed herein, aspects of the present disclosure may be employed in an integral, compact, in-casing noise and vibration mitigation system for a fluid displacement device, such as a rotary compressor or a fluid pump, which may ensure quiet operation for a normally noisy device. Fluid displacement devices referred to herein may be rotary compressors, expanders, pumps or engines, for example, including rolling piston compressors, sliding vane compressors, screw compressors, scroll compressors or reciprocating compressors. Aspects of the present disclosure may be used to reduce the noise and vibration in BLDC motors, where a stator is attached directly to the motor housing. In such a case, introduction of a stator holder, such as those described herein, to physically separate the stator from the housing may result in a reduction of noise and vibration of a BLDC motor. Aspects of the present disclosure also may be applied in integral BLDC motor driven fluid pumps where the stators and the pumps are directly attached to a common housing, similar to the embodiment of a rolling piston compressor described above. In such a case, inclusion of the stator holder and the pump holder may respectively reduce the noise and vibration of an integral BLDC motor driven fluid pump.

It should be understood that the foregoing description is intended merely to be illustrative thereof and that other embodiments, modifications, and equivalents are within the scope of the present disclosure recited in the claims appended hereto. Further, although each embodiment described above includes certain features, the present disclosure is not limited in this respect. Thus, one or more of the above-described or other features or methods of use, may be employed singularly or in any suitable combination, as the present disclosure and the claims are not limited to a specific embodiment.

What is claimed is:

1. A rotary compressor, comprising:
   a motor having a stator and a rotor electromagnetically coupled to one another;
   a pump physically coupled to the rotor of the motor, wherein the pump is configured to draw in fluid through a suction line to an internal space within the pump and to compress and discharge the fluid through a discharge line;
   a casing surrounding the motor and the pump;
   a stator holder coupled to the stator of the motor and the pump, wherein the stator holder is spaced from the casing so as to provide physical separation between the stator and the casing such that the stator and stator holder are not directly coupled to the casing, and wherein the stator holder is constructed and arranged to provide sharp impedance mismatches at interfaces between the stator holder and the stator so as to reduce acoustic and vibrational energy transfer between the stator and the pump, wherein the stator holder includes a first portion surrounding an exterior surface of the stator and defining a space that receives the stator, wherein the stator holder includes a second portion partially enclosing an entrance into the space, wherein the first portion is positioned between the exterior surface of the stator and the casing;
   a pressure separation member attached to the casing and located between the motor and the pump to create two spaces operable at different pressures within the casing;
   a pump holder coupled to the pump, wherein the pump holder is separately formed from the pressure separation member and coupled to the pressure separation member, wherein the pump holder is physically separated from the casing, and wherein the pump holder is constructed and arranged to reduce acoustic and vibrational energy transfer between the pump and the casing, and wherein the pump holder is coupled to the casing only via the pressure separation member;
   a suction pressure space that houses the motor and is fed by the suction line attached to a suction pressure side of the casing; and
   a discharge pressure space that houses the pump and through which high pressure gas is discharged into a discharge line attached to the discharge side of the casing,
   wherein the stator and the stator holder are not in direct contact with the casing such that an indirect transmission pathway for vibrational energy transfer is formed from the stator to the casing.

2. The compressor of claim 1, wherein the stator holder or the pump holder is constructed and arranged to increase impedance within the respective holder to transmission of stress waves associated with acoustic or vibrational energy due, at least in part, to any one or more of the presence of narrow cross sectional areas of the holder, small thickness of the holder, sudden changes in cross sectional area to create abrupt impedance discontinuities at an interface of the holder, and damping materials of the holder.

3. The compressor of claim 1, wherein the stator holder is coupled to the stator of the motor, or the pump holder is coupled to the pump, via at least one of a press-fit, an interference fit, a shrink fit, a fastener or a weld.

4. The compressor of claim 1, further comprising at least one damping component located within the stator holder or the pump holder, the at least one damping component configured to absorb acoustic or vibrational energy.

5. The compressor of claim 4, wherein the at least one damping component includes at least one of a washer, a spring, an elastomer or an energy absorbing material.

6. The compressor of claim 1, wherein the compressor is a rolling piston compressor.

7. The compressor of claim 1, wherein the pump holder is attached to the pressure separation member.

8. The compressor of claim 7, wherein the pressure separation member forms a portion of the discharge side of the casing.

9. The compressor of claim 1, wherein the pump includes a suction conduit and an elastomeric material disposed around the suction conduit for providing vibrational and acoustic damping at the suction conduit.

10. The compressor of claim 1, wherein the pump holder comprises a plurality of horizontal tabs attached to the pressure separation member.

11. The compressor of claim 1, wherein the casing comprising an upper casing and a lower casing, and wherein the pressure separation member is press fit between the upper casing and the lower casing.

12. The compressor of claim 11, wherein the upper casing, the lower casing, and the pressure separation member are joined with a single weld bead.

13. The compressor of claim 11, wherein the upper casing, lower casing, and pressure separation member overlap to form three layers.

14. The compressor of claim 1, wherein the casing comprises an upper casing and a lower casing, and wherein the pressure separation member is radially disposed relative to a longitudinal axis of the compressor between the upper casing and the lower casing such that the pressure separation member separates the upper casing from the lower casing.

15. The compressor of claim 1, wherein the stator holder includes a plurality of turns at a base of the stator holder.

16. A rotary compressor, comprising:
   a motor having a stator and a rotor electromagnetically coupled to one another;
   a pump physically coupled to the rotor of the motor, wherein the pump is configured to draw in fluid through a suction line to an internal space within the pump and to compress and discharge the fluid through a discharge line connected to a discharge port of the pump;
   a casing surrounding the motor and the pump;
   a stator holder coupled to the stator of the motor and the pump, wherein the stator holder is spaced from the casing so as to provide physical separation between the stator and the casing; and
   a pump holder coupled to the pump and a side wall of the casing, wherein the pump holder is configured to provide physical separation between the pump and the casing; and
   a rotary seal type suction connection inside the casing that includes an outer support and an inner support, wherein:
     the inner support is positioned within an inner space of the outer support;
     the inner support has a flange extending around a body of the inner support for holding the body of the inner support in place when positioned within the inner space of the outer support, wherein the flange is attached via a direct connection to the pump;
     the inner support is attached to the pump to form part of the pump;

the inner support is equipped with a suction pathway into the pump from the outer support;

the outer support is attached directly or indirectly to the casing and equipped with a stationary suction connection to the suction line;

the inner support is rotatable relative to the outer support; and the inner support and the outer support provide the suction pathway for a suction gas from the suction line into the casing by maintaining a rotary seal formed by a gap and lubricating oil between contacting surfaces of the inner support and the outer support, such that the suction line is connected to an interior of the casing without a direct suction line connection to the pump.

17. The compressor of claim 16, wherein damping is provided at the contacting surfaces of the inner support and the outer support.

18. A rotary compressor, comprising:

a motor having a stator and a rotor electromagnetically coupled to one another;

a pump physically coupled to the rotor of the motor, wherein the pump is configured to draw in fluid through a suction line to an internal space within the pump and to compress and discharge the fluid through a discharge line;

a casing surrounding the motor and the pump;

a stator holder coupled to the stator of the motor and the pump, wherein the stator holder is spaced from the casing so as to provide physical separation between the stator and the casing such that the stator and stator holder are not directly coupled to the casing, and wherein the stator holder is constructed and arranged to provide sharp impedance mismatches at interfaces between the stator and the pump, wherein the stator holder includes a first portion surrounding an exterior surface of the stator and defining a space that receives the stator, wherein the stator holder includes a second portion partially enclosing an entrance into the space, wherein the first portion is positioned between the exterior surface of the stator and the casing;

a pressure separation member attached to the casing and located between the motor and the pump to create two spaces operable at different pressures within the casing;

a pump holder coupled to the pump, wherein the pump holder is separately formed from the pressure separation member and coupled to the pressure separation member, wherein the pump holder is physically separated from the casing, and wherein the pump holder is constructed and arranged to reduce acoustic and vibrational energy transfer between the pump and the casing, and wherein the pump holder is coupled to the casing only via the pressure separation member; wherein the pump holder includes a first portion at least partially surrounding the pump, wherein the first portion is positioned between an exterior surface of the pump and the casing and defines a space which receives the pump, wherein the pump holder includes a second portion at least partially enclosing the space defined by the first portion;

a suction pressure space that houses the motor and is fed by the suction line attached to a suction pressure side of the casing; and a discharge pressure space that houses the pump and through which high pressure gas is discharged into a discharge line attached to the discharge side of the casing.

\* \* \* \* \*

UNITED STATES PATENT AND TRADEMARK OFFICE
CERTIFICATE OF CORRECTION

| | | |
|---|---|---|
| PATENT NO. | : 12,448,971 B2 | |
| APPLICATION NO. | : 16/889055 | |
| DATED | : October 21, 2025 | |
| INVENTOR(S) | : Kang P. Lee et al. | |

It is certified that error appears in the above-identified patent and that said Letters Patent is hereby corrected as shown below:

In the Claims

Column 25, Claim 1, Line 17:
"stator and the casing such that the stator and stator"
Should read:
--stator and the casing such that the stator and the stator--

Column 25, Claim 1, Line 18:
"holder are not directly coupled to the casing, and"
Should read:
--holder are not directly coupled to the casing,--

Column 25, Claim 1, Line 46:
"through which high pressure gas is discharged into a"
Should read:
--through which high pressure gas is discharged into the--

Column 25, Claim 1, Line 47:
"discharge line attached to the discharge side of the"
Should read:
--discharge line attached to a discharge side of the--

Column 25, Line 67 to Column 26, Line 1, Claim 4:
"one damping component located within the stator holder or the pump holder, the at least one damping component"
Should read:
--one damping component located within the stator holder, the at least one damping component--

Signed and Sealed this
Second Day of December, 2025

John A. Squires
*Director of the United States Patent and Trademark Office*

CERTIFICATE OF CORRECTION (continued)
U.S. Pat. No. 12,448,971 B2

Column 27, Claim 18, Line 31:
"stator and the casing such that the stator and stator"
Should read:
--stator and the casing such that the stator and the stator--

Column 27, Claim 18, Lines 33-34:
"wherein the stator holder is constructed and arranged to provide sharp impedance mismatches at interfaces"
Should read:
--wherein the stator holder is constructed and arranged to reduce acoustic and vibrational energy transfer--

Column 28, Claim 18, Lines 30-31:
"through which high pressure gas is discharged into a discharge line attached to the discharge side of the"
Should read:
--through which high pressure gas is discharged into the discharge line attached to a discharge side of the--